July 1, 1958 R. A. GOODALL 2,841,342
WINDING MACHINES
Filed April 23, 1953 15 Sheets-Sheet 1

INVENTOR.
Robert A. Goodall,
BY
Fidler, Crouse & Beardsley
Attys.

July 1, 1958  R. A. GOODALL  2,841,342
WINDING MACHINES
Filed April 23, 1953  15 Sheets-Sheet 2
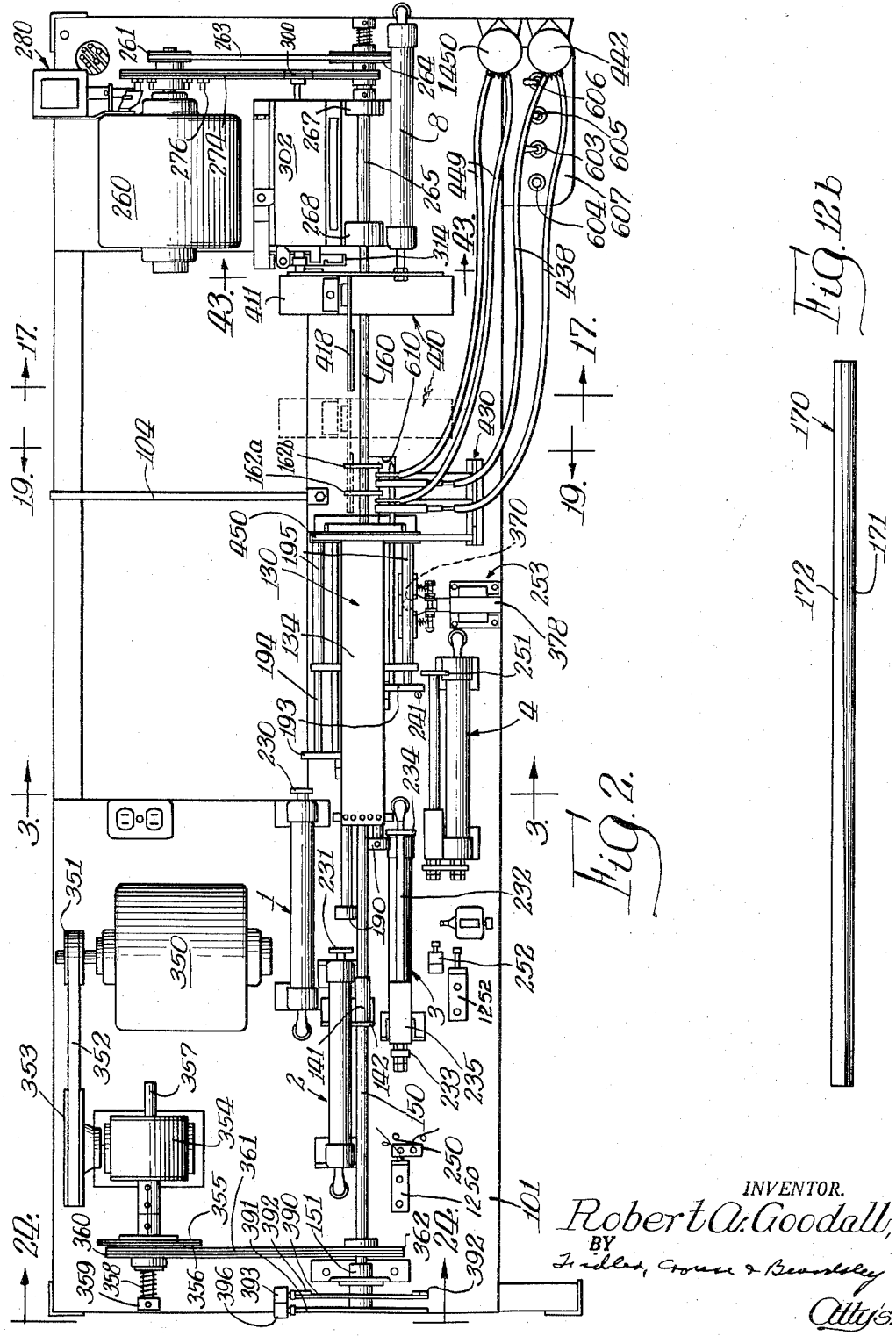
INVENTOR.
Robert A. Goodall,
BY
Fidler, Crouse & Beardsley
Attys.

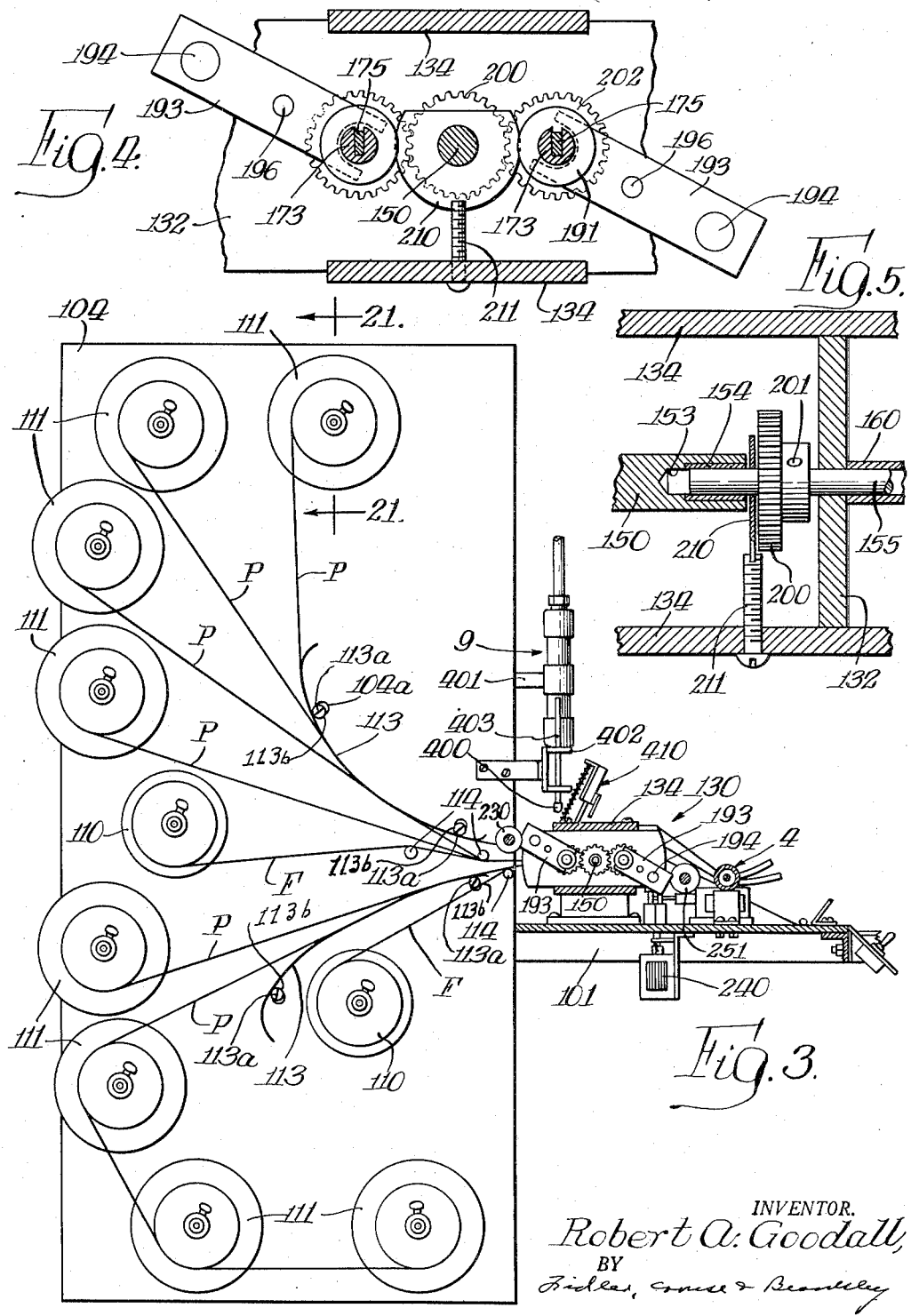

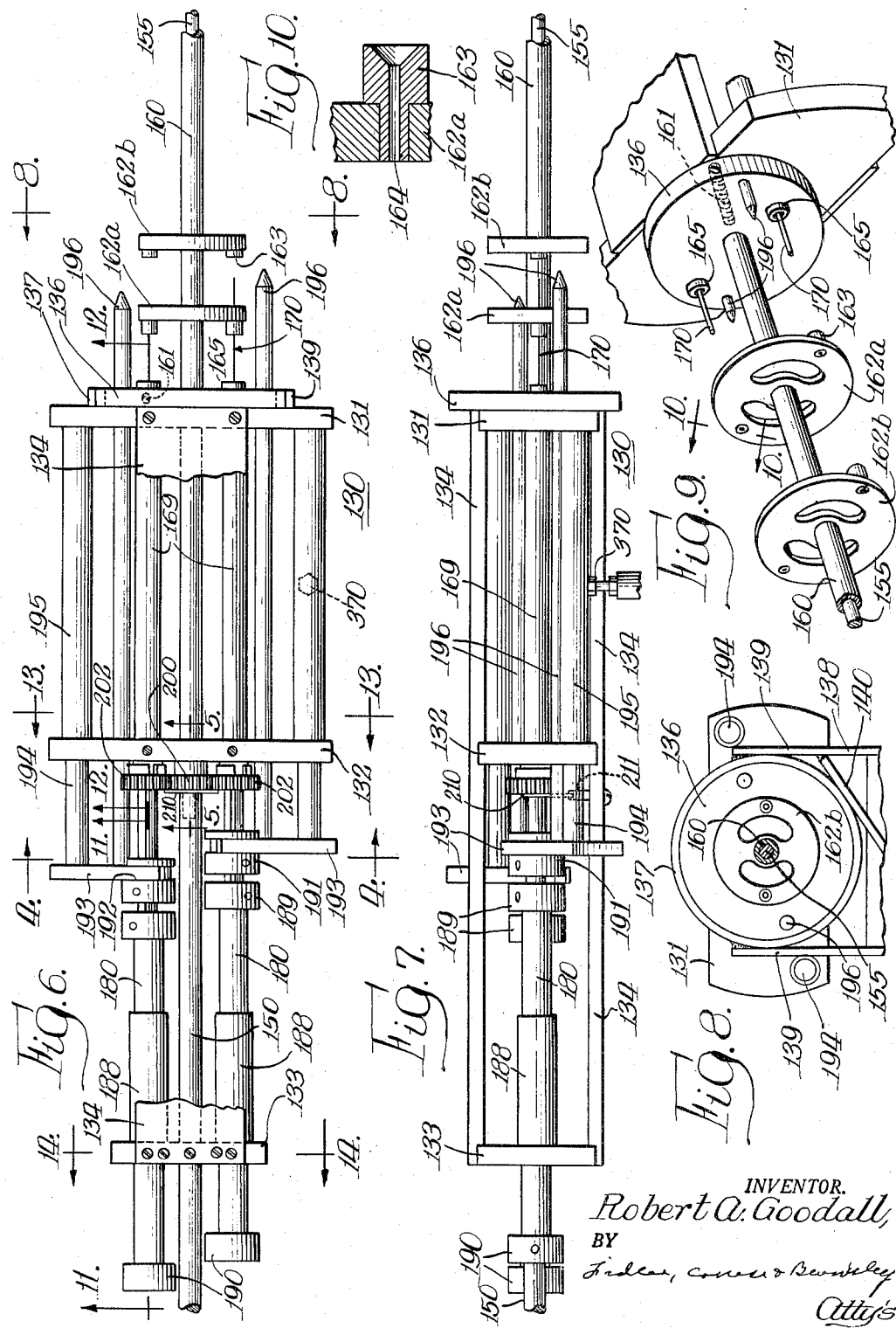

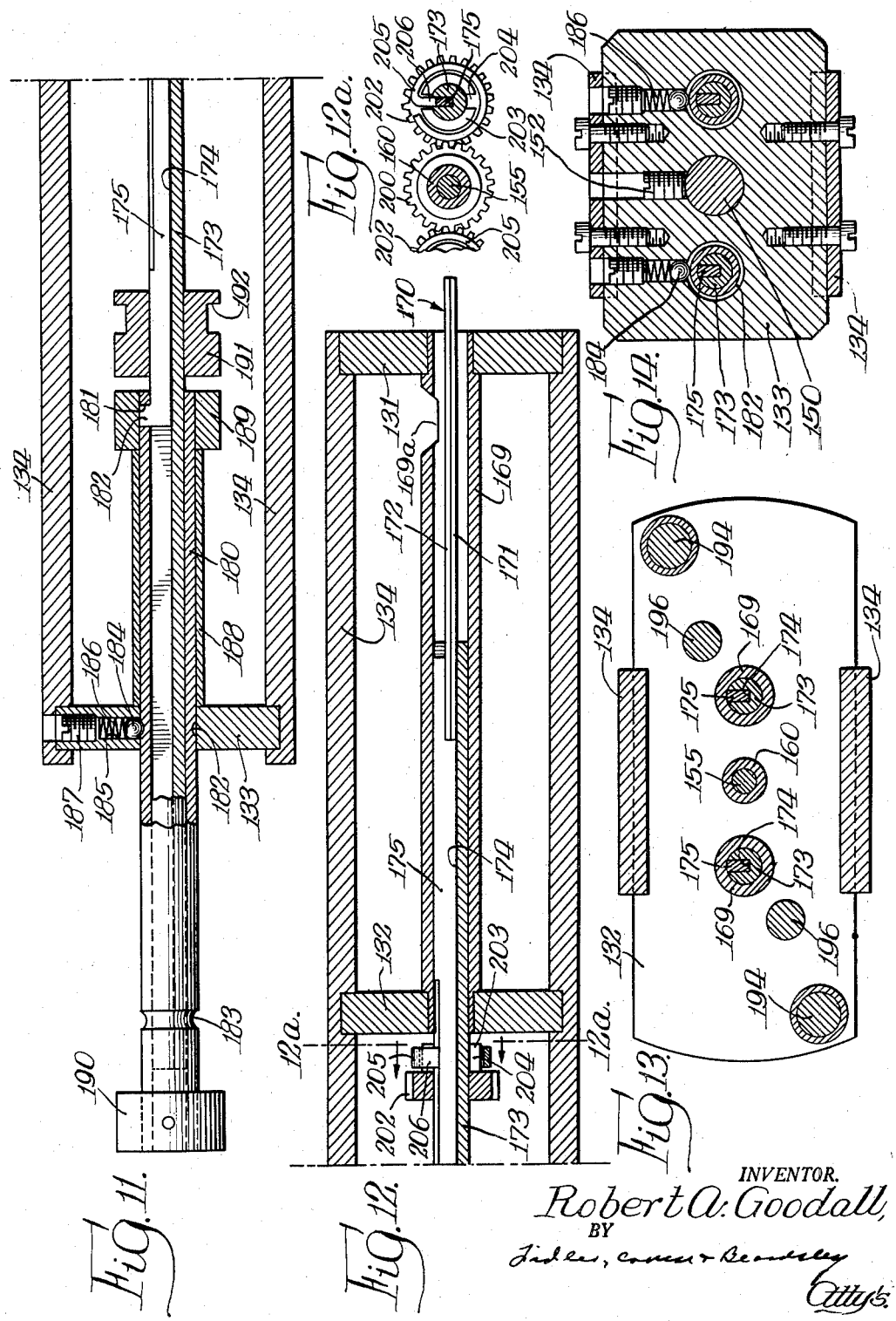

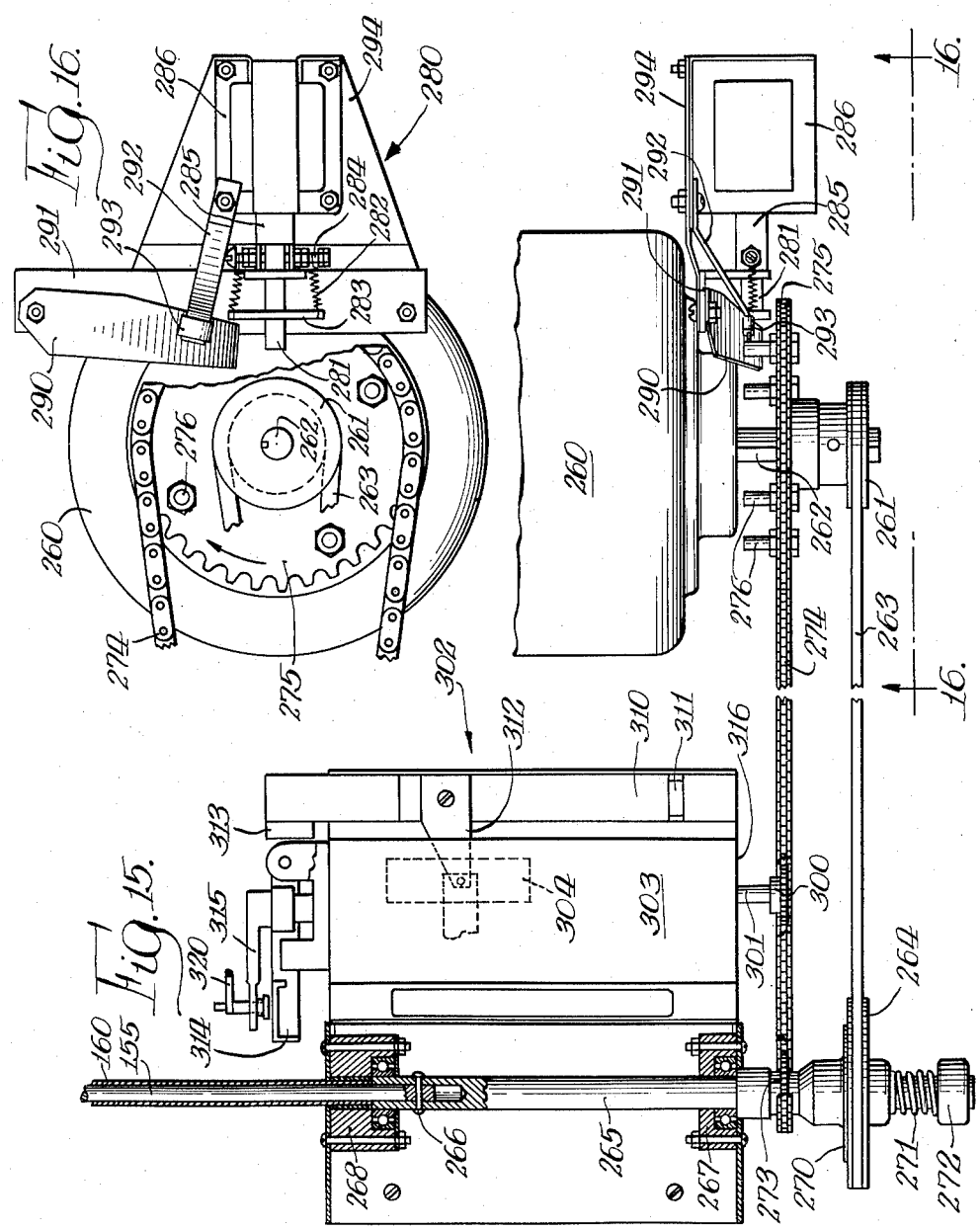

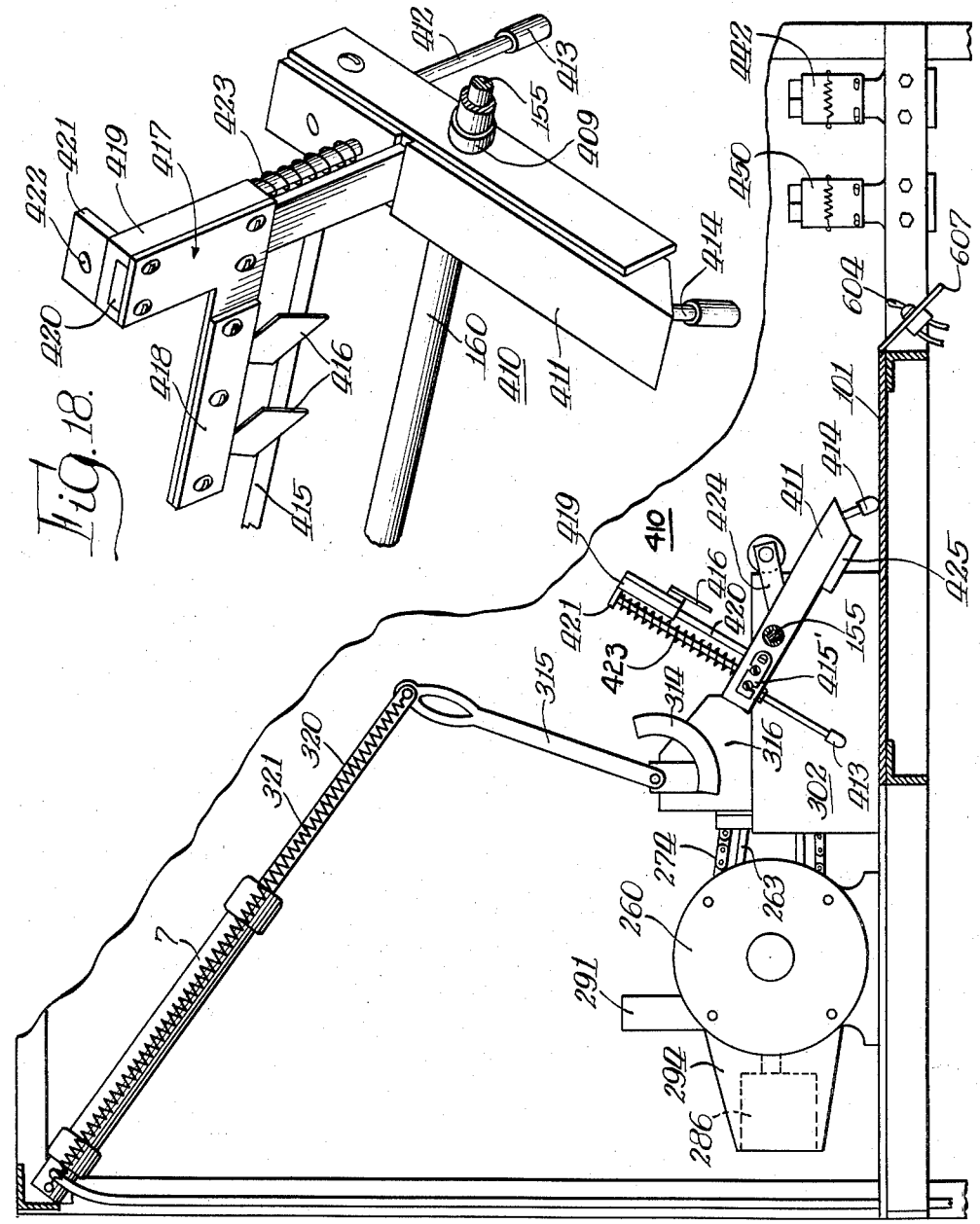

July 1, 1958  R. A. GOODALL  2,841,342
WINDING MACHINES
Filed April 23, 1953  15 Sheets-Sheet 8
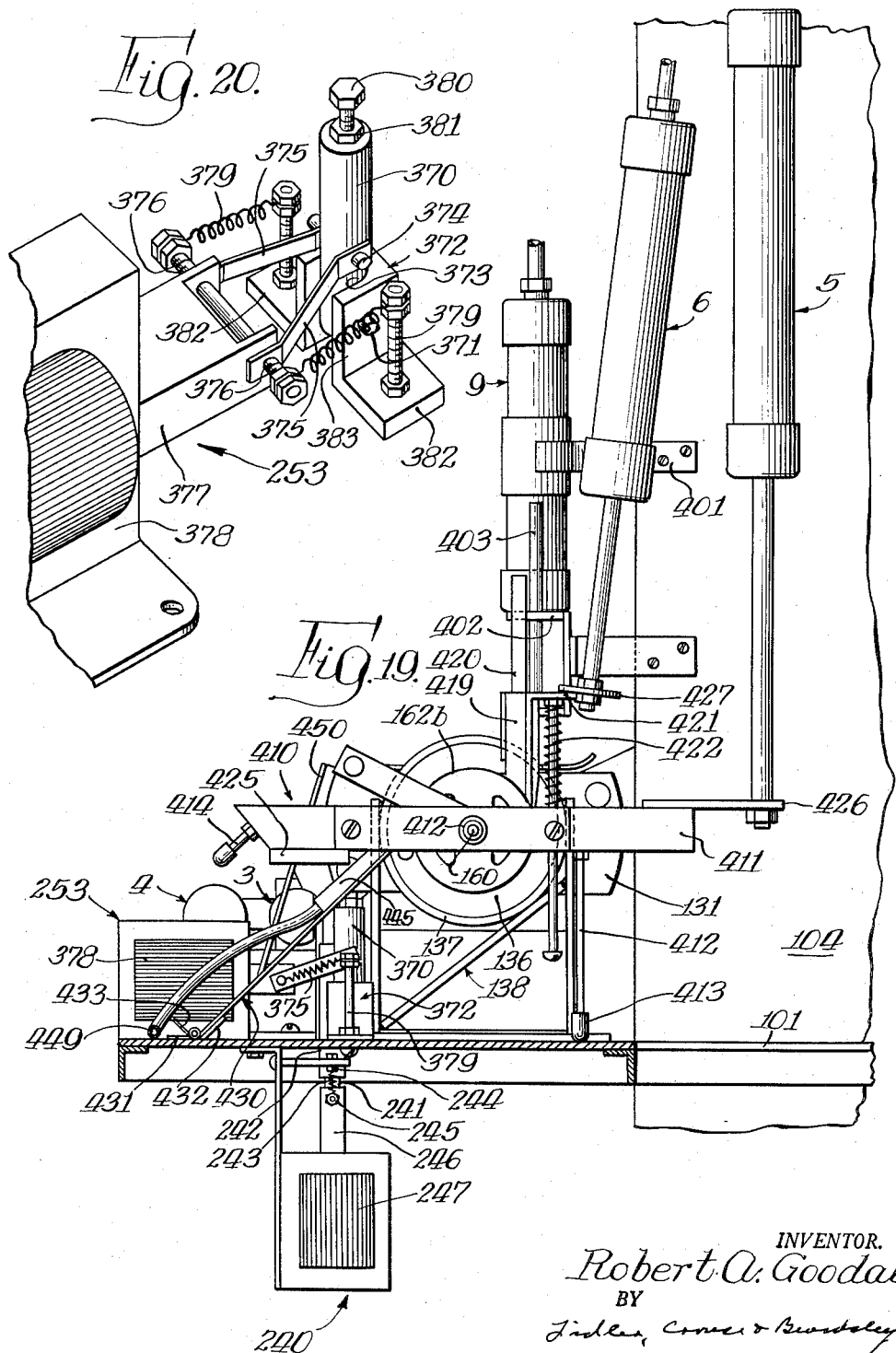
INVENTOR.
Robert A. Goodall,
BY
Fidler, Cromer & Beardsley
Atty's July 1, 1958 R. A. GOODALL 2,841,342
WINDING MACHINES
Filed April 23, 1953 15 Sheets-Sheet 9
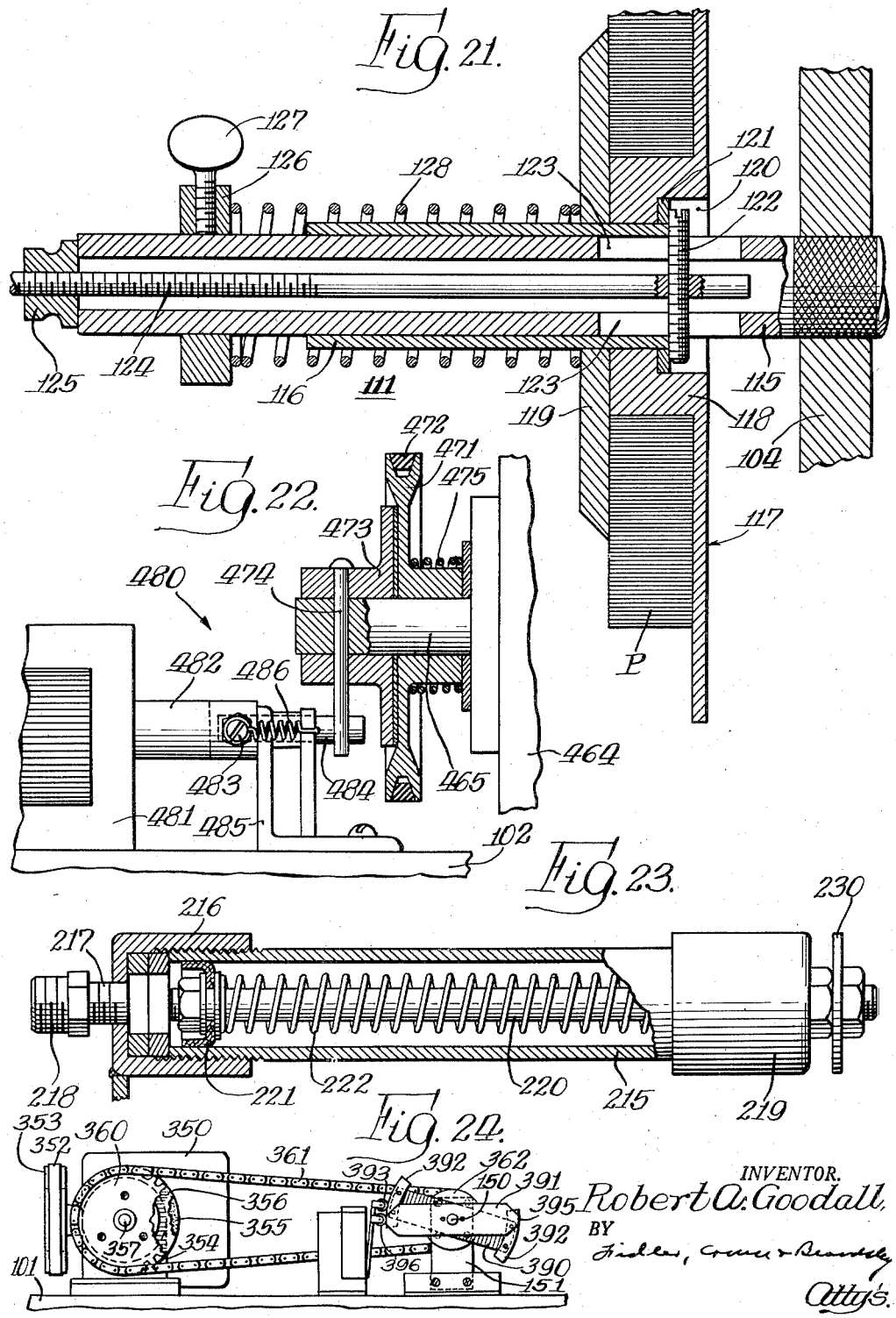

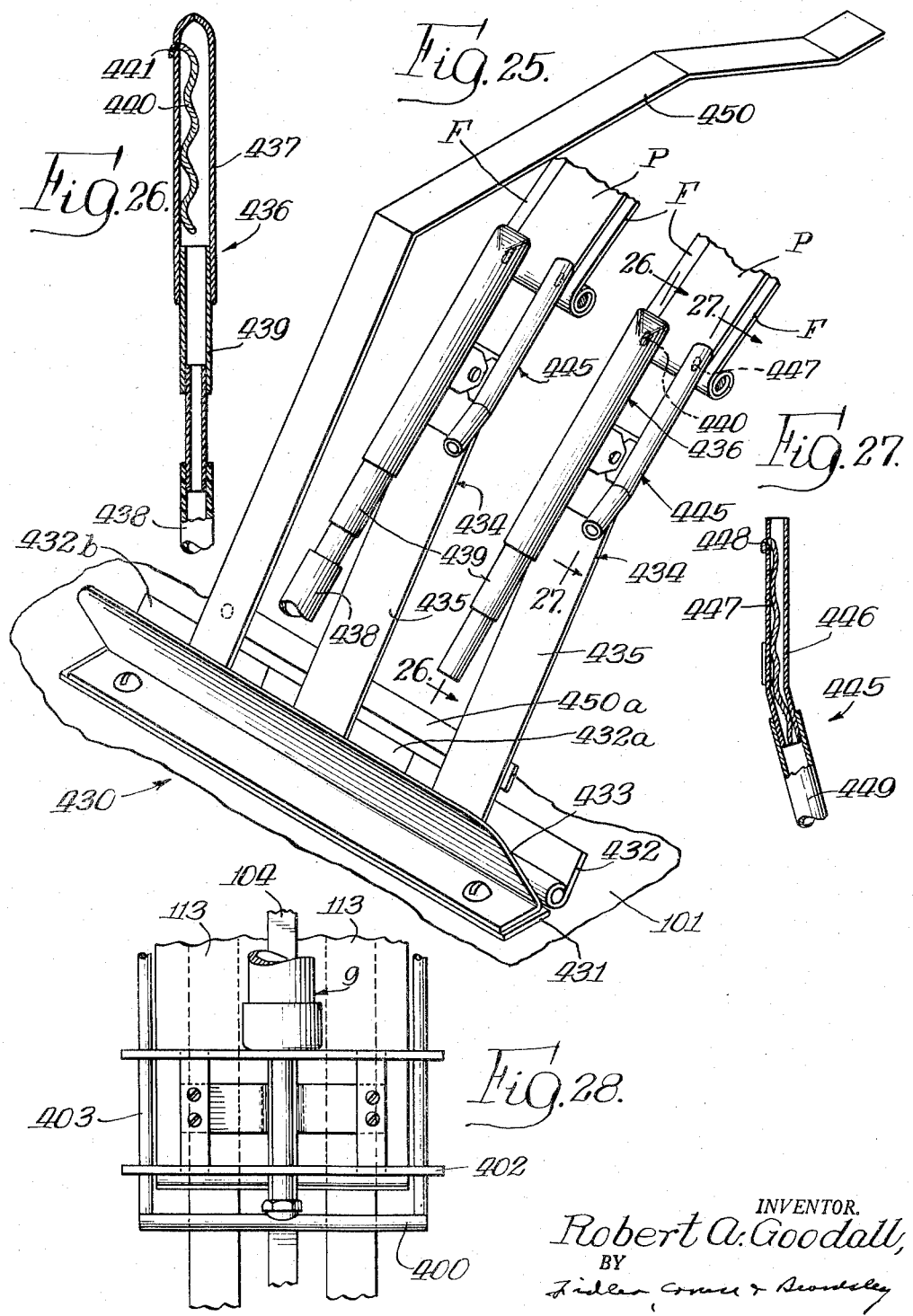

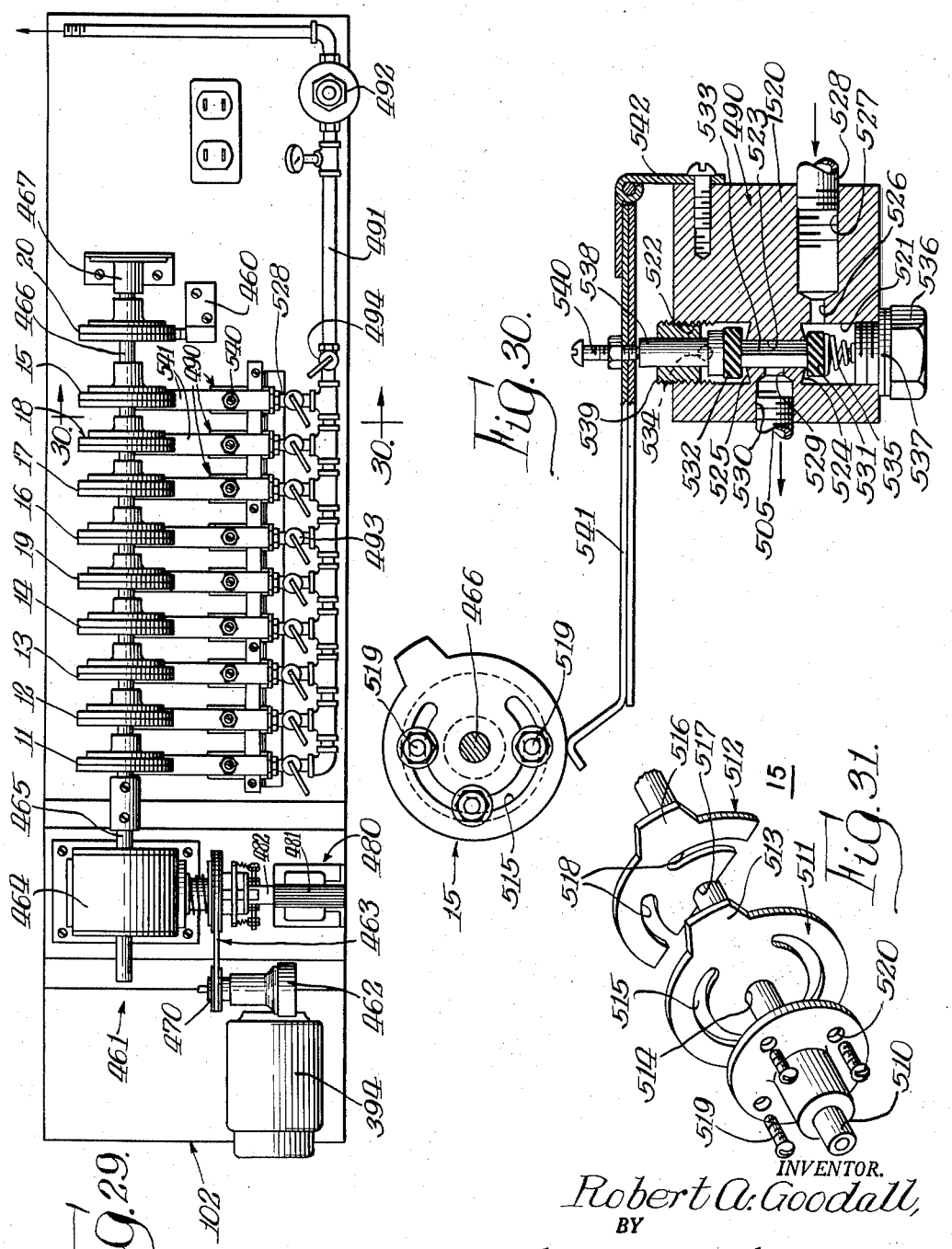

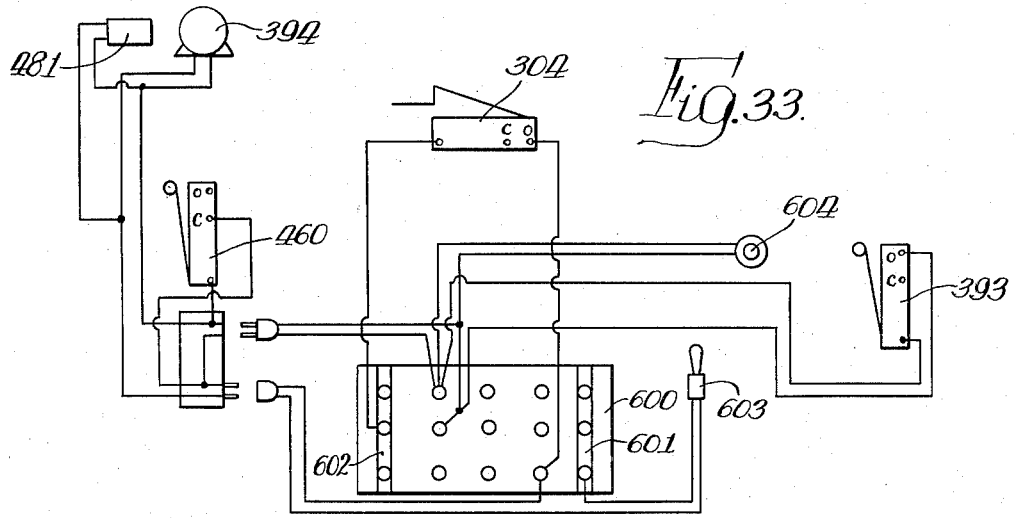
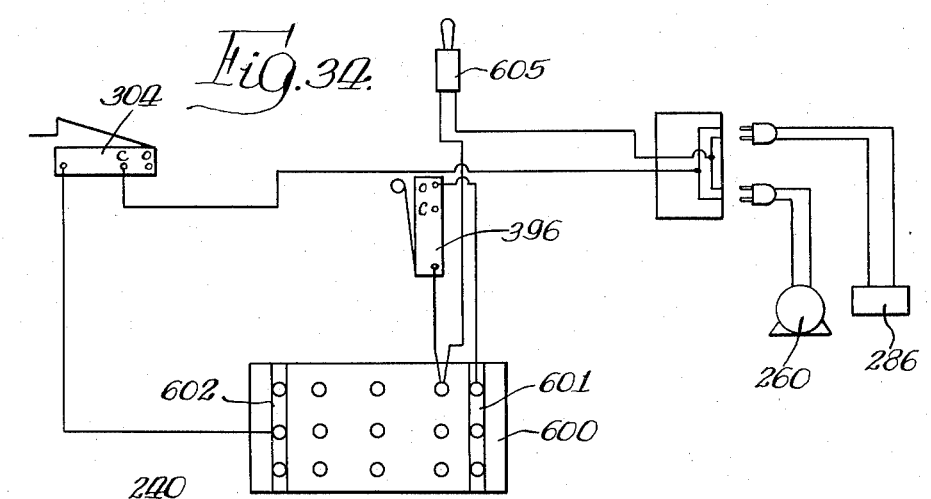
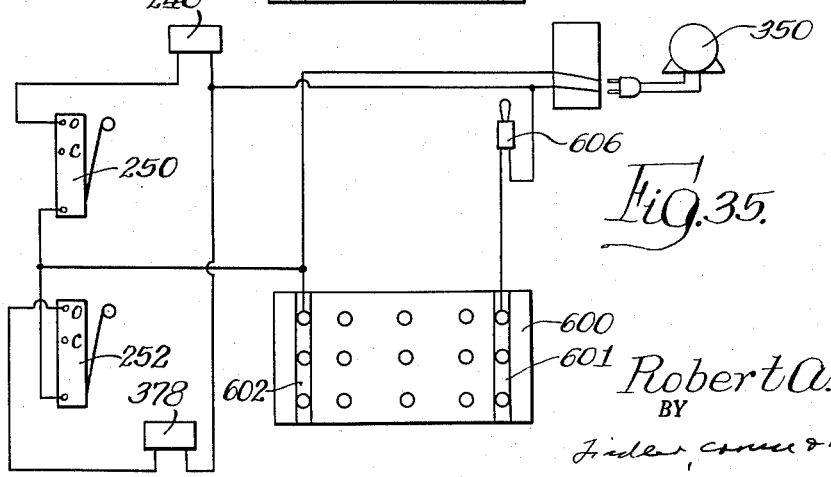

July 1, 1958  R. A. GOODALL  2,841,342
WINDING MACHINES
Filed April 23, 1953  15 Sheets-Sheet 14
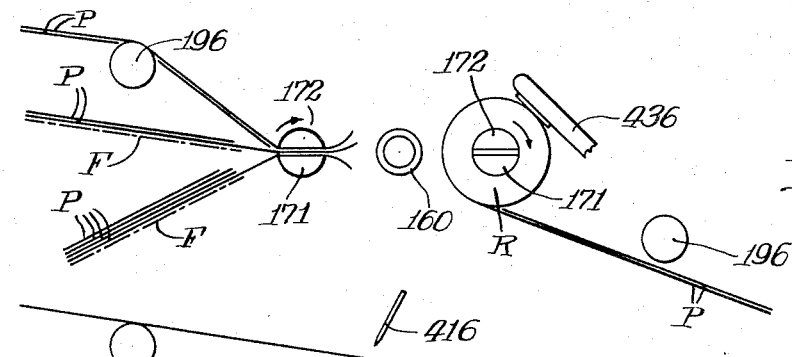
Fig. 36.
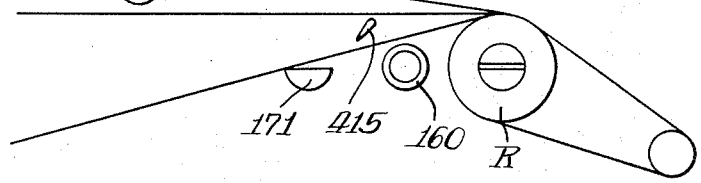
Fig. 37.
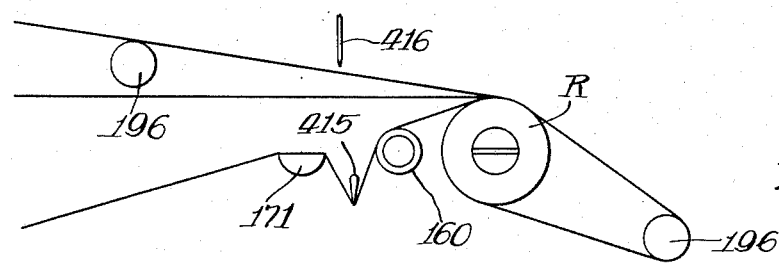
Fig. 38.
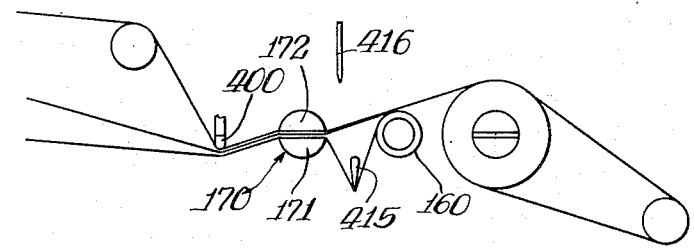
Fig. 39.
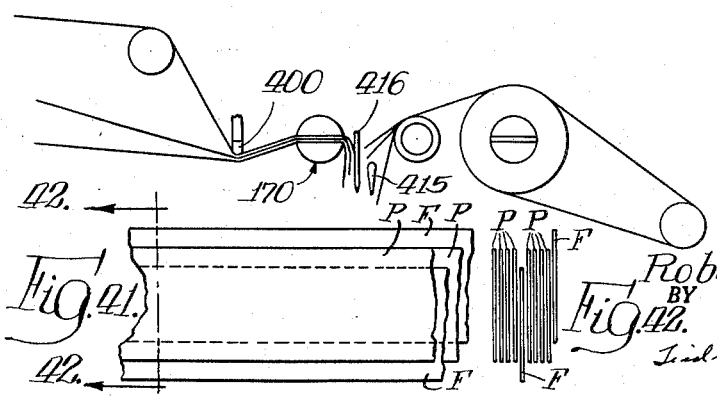
Fig. 40.
Fig. 41.
Fig. 42.
INVENTOR.
Robert A. Goodall,
BY
Tidler, Crouse + Beardsley
Atty's.

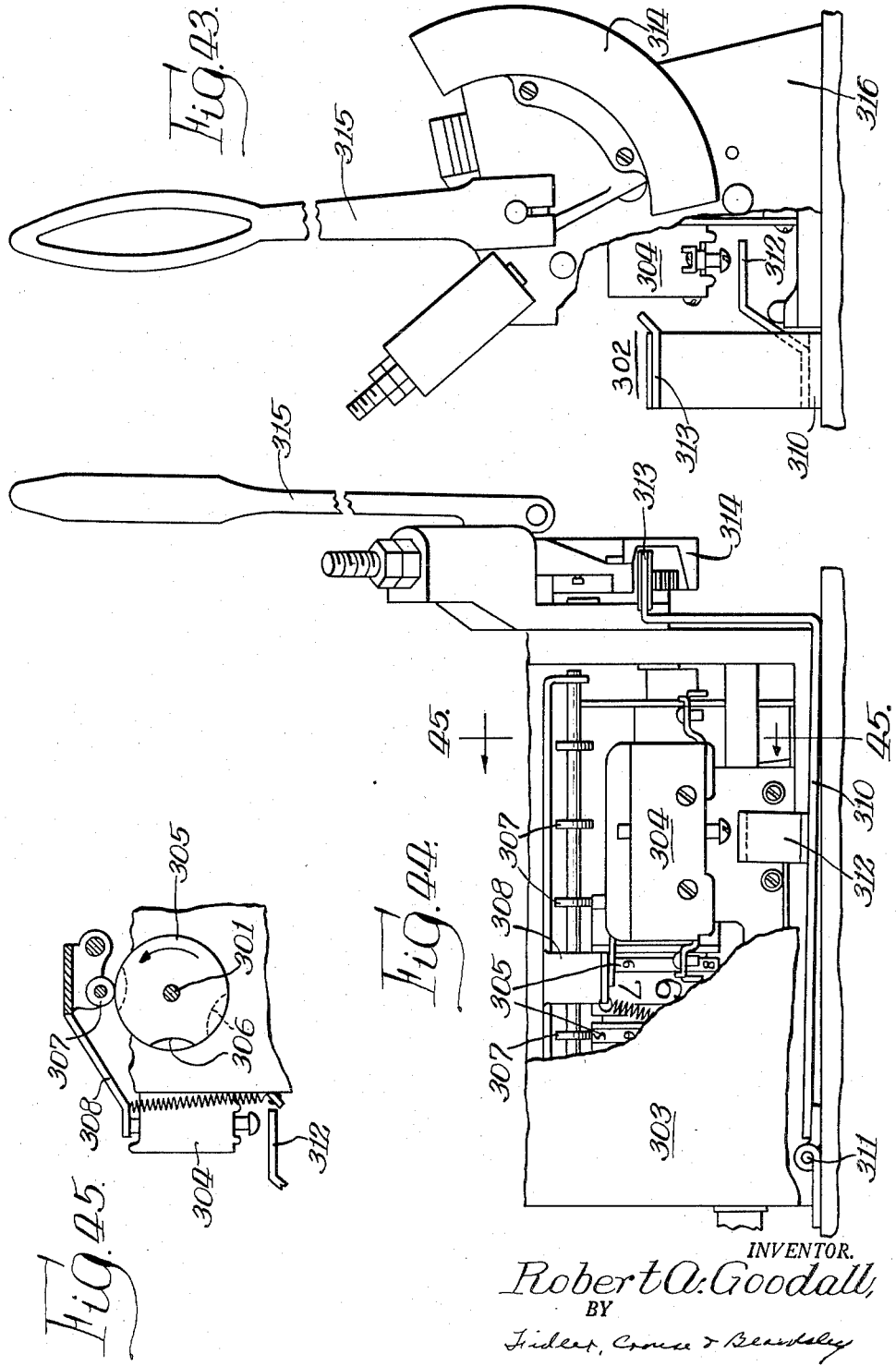

United States Patent Office 2,841,342
Patented July 1, 1958

2,841,342
WINDING MACHINES

Robert A. Goodall, Ogallala, Nebr., assignor, by mesne assignments, of one-half to Clarice M. Goodall, Ogallala, Nebr., as executrix of said Robert A. Goodall, deceased, and one-half to Clarice M. Goodall, individually Application April 23, 1953, Serial No. 350,589

15 Claims. (Cl. 242—56.1)

This invention relates to winding machines and has to do more particularly with a machine for winding strip material to form a roll. The invention is especially well adapted for winding together strips of metal foil and insulating material to form electrical capacitors.

Electrical capacitors formed by winding together two or more strips of metal foil and interposed strips of insulating material heretofore have been formed by operations which have included principally manual operations. Such operations are time consuming and expensive and it is difficult to maintain the desired degree of accuracy and uniformity in forming capacitors.

An object of the present invention is to provide a novel fully automatic machine for winding elongated strip material to form a roll.

Another object is to provide a fully automatic machine for winding strips of metal foil and interposed strips of insulating material together into a roll to form electrical capacitors.

Another object is to provide a fully automatic machine for winding strip material to form a roll in which the strip material is wound under predetermined, closely controlled tension.

Another object is to provide a machine for winding strip material to form a roll wherein the strip material is maintained under positive control at all times and there are no free ends of any substantial length which might become unmanageable by reason of the static developed in the movement of the material.

Another object is to provide a machine for winding strip material to form a roll wherein a novel mandrel is provided for receiving and positively gripping the material to be wound, in such manner as to insure against tearing or wrinkling of the material.

Another object is to provide a machine for winding strip material to form a roll wherein a novel mandrel is provided whereby the mandrel may be withdrawn from the wound roll without disarranging the turns of the roll.

Other objects of the invention are to provide a machine for winding strip material and having a novel mechanism for severing the strip material at the conclusion of the winding operation; a novel mechanism for rotating the mandrel to wind the strip material thereon to form a roll; novel means for almost instantaneously halting the mechanism for rotating the mandrel; novel means for guiding the strip to the winding material; novel means for adhesively securing the terminal end of the rolled strip material to prevent unwinding of the roll after it has been removed from the machine; a novel mechanism for periodically rotating through a predetermined angle a winding head carrying a mandrel; novel means for almost instantaneously halting the driving mechanism which rotates the winding head.

Other objects and advantages of the invention will appear from the following description taken in connection with the appended drawings in which:

Fig. 2 is a horizontal sectional view taken approximately alonge line 2—2 of Fig. 1;

Fig. 3 is an enlarged, fragmentary cross-sectional view taken along line 3—3 of Fig. 2;

Fig. 4 is an enlarged, fragmentary, cross-sectional view taken along line 4—4 of Fig. 6;

Fig. 5 is an enlarged, fragmentary, cross-sectional view taken along line 5—5 of Fig. 6;

Fig. 6 is a fragmentary top view of the winding head and certain associated members;

Fig. 7 is a front elevational view of the mechanism of Fig. 6;

Fig. 8 is a cross-sectional view taken along line 8—8 of Fig. 6;

Fig. 9 is an enlarged fragmentary, perspective view of a portion of the winding head;

Fig. 10 is an enlarged, fragmentary, sectional view taken along line 10—10 of Fig. 9;

Fig. 11 is an enlarged, fragmentary, sectional view taken along line 11—11 of Fig. 6;

Fig. 12 is an enlarged, fragmentary, sectional view taken along line 12—12 of Fig. 6;

Fig. 12a is a sectional view taken along line 12a—12a of Fig. 12;

Fig. 12b is an enlarged, fragmentary view of the mandrels;

Fig. 13 is an enlarged sectional view taken along line 13—13 of Fig. 6;

Fig. 14 is an enlarged sectional view taken along line 14—14 of Fig. 6;

Fig. 15 is an enlarged fragmentary view, partially in cross section, of a portion of the mandrel shaft rotating mechanism;

Fig. 16 is a view of a section taken along line 16—16 of Fig. 15;

Fig. 17 is an enlarged fragmentary, cross-sectional view taken along line 17—17 of Fig. 2;

Fig. 18 is an enlarged fragmentary, perspective view of the offset and cutter mechanism;

Fig. 19 is an enlarged fragmentary, cross-sectional view taken along line 19—19 of Fig. 2;

Fig. 20 is an enlarged fragmentary, perspective view of the winding head stop mechanism;

Fig. 21 is an enlarged fragmentary, cross-sectional view taken along line 21—21 of Fig. 3;

Fig. 22 is an enlarged fragmentary view, partially in cross section, of a portion of the cam controller drive;

Fig. 23 is an enlarged fragmentary view, partially in cross section, of one of the cylinders;

Fig. 24 is a slightly enlarged, fragmentary cross-sectional view taken along line 24—24 of Fig. 2;

Fig. 25 is an enlarged, perspective view of the gluing mechanism;

Fig. 26 is a slightly enlarged, fragmentary cross-sectional view taken along line 26—26 of Fig. 25;

Fig. 27 is a cross-sectional view taken along line 27—27 of Fig. 25;

Fig. 28 is an enlarged fragmentary, front elevational view of a portion of the hold-down mechanism;

Fig. 29 is an enlarged sectional view taken along line 29—29 of Fig. 1;

Fig. 30 is an enlarged sectional view taken along line 30—30 of Fig. 29;

Fig. 31 is an exploded, perspective view of the controller cam of Fig. 30;

Fig. 33 is a wiring diagram of the cam motor circuit;

Fig. 34 is a wiring diagram of the mandrel rotating motor circuit;

Fig. 35 is a wiring diagram of the winding head motor circuit;

Fig. 36 is a diagrammatic view illustrating the position of certain of the winding elements in one position which they take during the winding operation;

Fig. 37 is a view similar to Fig. 36 showing the elements in another position;

Fig. 38 is a view similar to Fig. 36 showing the elements in still another position;

Fig. 39 is a view similar to Fig. 36 showing the elements in still another position;

Fig. 40 is a view similar to Fig. 36 showing the elements in still another position;

Fig. 41 in a fragmentary, somewhat diagramatic, view showing the arrangement of strips viewed from above, the thickness of the strips being exaggerated;

Fig. 42 is a sectional view taken along line 42—42 of Fig. 41;

Fig. 43 is an enlarged fragmentary sectional view taken along line 43—43 of Fig. 2;

Fig. 44 is a front elevational view, partially in cross section of the structure of Fig. 43; and Fig. 45 is a fragmentary sectional view taken along line 45—45 of Fig. 44.

Figure 1:
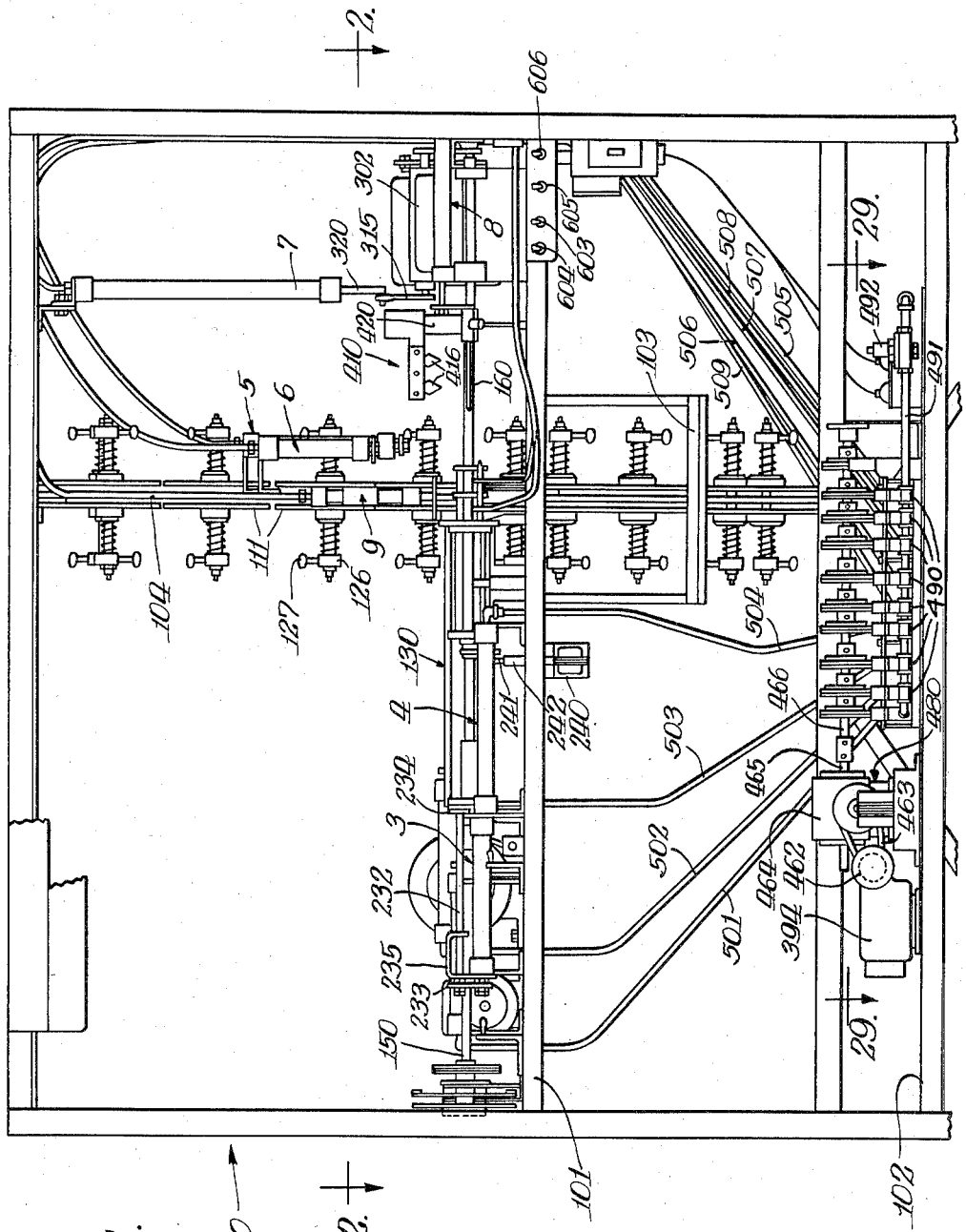
Figure 1 is a front elevational view of a machine constructed in accordance with the invention.

Referring now to Fig. 1 the machine includes a frame 100 formed of a plurality of vertical and horizontal structural members, such as angle irons and straps or bars, suitably secured together, as by welding. Supported on the frame 100 are a plurality of horizontal panels or shelves including a main shelf 101 on which a number of the principal operating parts of the machine are mounted, a lower shelf 102 on which a portion of the control mechanism is mounted, an intermediate shelf 103 for holding a collecting receptacle (not shown), and a wheel panel 104 is supported by the frame and extends vertically above and below the main shelf 101.

Mounted on the wheel panel 104 is a plurality of holders 110 for rolls of metal foil F in strip form and holders 111 for rolls of insulating material P in strip form (sometimes hereinafter called "paper" strip). Each of the holders 110 and 111 is adapted to maintain a predetermined friction on the roll so as to permit proper tension on and feeding of the strip material to a winding head 130 which winds the strips together to form a roll. It should be explained at this point that the foil holders and paper holders may be varied in number and arrangement depending upon the desired number and arrangement of strips of foil and paper which are to be wound together. Also the arrangement for guiding the strips from the holders or what I call "stringing" may also be varied.

For the purpose of illustrating the present invention there is shown eight paper holders and two foil holders in an arrangement (see Fig. 3) whereby the strips are fed to the winding head in such manner that when the capacitor is wound there is an inner turn of foil, then four turns of paper, then an outer turn of foil, then four turns of paper. It will be noted that in the arrangement shown two of the lower paper wheels 111 serve to guide the strips of paper from their respective wheels 111 toward the winding head 130.

A plurality of suitably curved paper guides 113 are secured to the wheel panel 104 in appropriate positions as by screws 113a extending through tubular portions 113b, secured to the guides as by welding. The screws 113a extend through slots 104a in the panel 104 whereby the positions of the guides 113 may be adjusted. The guides 113 are suitably shaped so as to guide the strips of foil F and paper P respectively into proper feeding relation to the winding head 130. The paper guides 113 are formed preferably of sheet material and extend outwardly from the wheel panel 104 a sufficient distance laterally to accommodate the widths of the strips P and F. The guides 113 are of such length as to apply sufficient friction to the strips to maintain tension on the strips, which tension is independent of the diameter of the roll of strip material. In order to aid the guides 113 in guiding the strips, one or more rollers 114 are provided which extend outwardly from the wheel panel 104 in a manner analogous to the guide 113. The rollers 114 are employed at locations where the strips P and F converge and where the paper guides of strip form, such as the guides 113, might interfere with the passage of the strips, and are so located as to divided the strips P and F into three groups, as shown in Fig. 3.

The machine of the present invention is constructed and preferably is employed to wind two capacitors or like devices simultaneously. To this end a plurality of foil and paper holders and guides such as just described is mounted on each face of the wheel panel 104 as will be seen from Fig. 1.

The foil and paper holders 110 and 111 preferably are similar in construction except that the mounting wheel for the roll of foil may be somewhat smaller in diameter than the mounting wheel for the paper, inasmuch as the roll of foil is smaller in diameter than the roll of paper.

One such holder is shown in detail in Fig. 21 to which reference is now made. The holder 111 includes a hollow spindle or hub 115 which is secured in the wheel panel 104 as by a non-slip press fit, to which end the central portion of the hub preferably is knurled, and projects equally from each face of the panel 104. A tube 116 which serves as a bearing and spring guide is fitted over the projecting portion of the hub and is pressed into a wheel 117 having a hub portion 118 which carries a roll of paper P (or a roll of foil F as the case may be). A retainer flange 119 is journaled on the tube 116 and is adapted to bear against the end wall of the hub 118 and the side of the roll P to retain the latter on the wheel 117. The hub 118 is formed with a cavity 120 which receives a washer 121 mounted on the tube 116 and bearing against the bottom wall of the cavity 120.

The wheel 117 is adjustably positioned on the hub 115 by a mechanism which permits accurate adjustment of the wheel and consequently accurate positioning of the roll P in a lateral direction relatively to the winding head 130, which is important to the accurate winding of the capacitor as will appear hereinafter. The adjusting mechanism includes a wheel stop 122 which extends through aligned longitudinally extending slots 123 formed in the hub 115 and projects therefrom across the end of the tube 116 and a portion of the washer 121. The wheel stop 122 is threaded substantially throughout its length and is screwed through an adjusting screw 124 which extends into the hub 115 and is positioned therein by a thumb nut 125.

A collar 126 is adjustably secured in position on the hub 115 by a thumb screw 127. A coil spring 128 seats at one end against the collar 126 and bears at the other end against the flange 119, to urge the latter and the wheel 117 and washer 121 toward the wheel stop 122. The spring 128 exerts a uniform, predetermined pressure on the flange 119 and thus a predetermined uniform friction is exerted on the wheel 117 which may be made sufficient to maintain the paper taut between the roll P and the winding head 130. This friction may be adjusted by adjusting the position of the collar 126.

As the strip is withdrawn from the wheel, the tension on the strip becomes less. Accordingly, during operation, it is desirable to adjust the drag exerted by the spring 128 at intervals. As pointed out above, tension on the strips also is provided by the long guides 113.

The winding head 130 (Figs. 1 and 2) is mounted on the main shelf 101 for intermittent rotational movements successively through 180 degrees about its longitudinal axis. The winding head 130 (see Figs. 6 and 7) includes a front head plate 131, a middle head plate 132 of similar form, and a rear head plate 133, all spaced apart longitudinally and connected together by a pair of spaced tie plates 134, 134, thus forming a rigid framelike structure which serves to carry the remaining members of the winding head 130.

A head bearing member 136 of circular shape is secured to the outer face of the front head plate 131 and is journaled in a circular head bearing 137 supported on the main shelf 101 by a bearing support 138 of suitable construction and which preferably includes uprights 139 (Fig. 8) and a brace 140. A second bearing 141 for the winding head 130 is provided by a sleeve 142 carried by a bracket 143 secured to the shelf 101, which sleeve journals the winding shaft 150.

If desired a bearing (not shown) may be provided in addition to or in lieu of the bearing 136. Such bearing is located to the right of the head 130 (as viewed in Fig. 1) beyond the mandrel guides hereinafter described.

The winding head 130 is rotated by a head drive shaft 150 which is journaled at one end (left-hand end as viewed in Fig. 2) by a bearing 151 secured on the main shelf 101. The head drive shaft 150 extends through and is secured in the rear head plate 133 as by a set screw 152 (Fig. 14). The head drive shaft 150 at its other end (right-hand end) is formed with a socket 153 (Fig. 5) in which is located a sleeve bearing 154 into which is pressed one end of a winding drive shaft 155, the function of which is explained hereinafter.

A mandrel guide shaft 160 (Fig. 6) of hollow form extends through the front and middle head plates 131 and 132 and is secured in the head bearing plate 136 by a set screw 161 (see Fig. 9). The mandrel guide shaft 160 projects beyond the front head plate and receives and aids in supporting the winding drive shaft 155 which is supported at its right-hand end (as viewed in Fig. 6) in a manner hereinafter described. The mandrel guide shaft 160 also serves to rotatably support a pair of inner and outer spaced mandrel guides 162a and 162b (Fig. 9), which are rigidly secured on the mandrel guide shaft. Each of the mandrel guides is of generally disc shape and has adjacent the periphery and in diametrically opposed positions, a mandrel guide bearing 163 having a mandrel guide opening 164 extending therethrough and which is flared at its outer end to facilitate the entry of the mandrel (hereinafter described) therein. A pair of guide bearings 165, 165 are secured in the head bearing plate 136, which are generally similar to the bearing 163 except that they have larger faces and the bore is countersunk at the inner end instead of the outer end. The guide bearings 163 on the guides 162a and 162b respectively are aligned and are in alignment with the guide bearings 165.

Secured in and extending between the front and middle head plates are a pair of tubular spacers 169 (Fig. 6) which serve as guides for the mandrel carrying members now to be described. Each spacer 169 is provided with a slot 169a which permits access to the mandrel therein and removal of any strip material which may have been accidentally carried into the spacer upon retraction of the mandrel. Each mandrel 170 (see Figs. 12 and 36) is formed by two separate semicircular segments or mandrel halves 171, 172 which are adapted to be shifted relatively in a longitudinal direction independently whereby there may be projected separately into an active position wherein they extend through the mandrel guides 162a, 162b, and a retracted position wherein they are retracted out of the latter. The mandrel segments 171, 172 are complementally tapered along their flat surfaces, as seen in Fig. 12b for a purpose which will appear hereinafter. The bottom mandrel segment 171 is carried by a mandrel shaft 173 which is provided with a relatively deep slot 174 throughout its length. The bottom mandrel segment 171 is secured in the bottom of the slot 174 by suitable means such as silver solder and projects beyond the end of the shaft 173 a distance sufficient to permit the bottom mandrel segment 171 to be projected through the front head plate 131, the head bearing plate 136 and the mandrel guides 162a, 162b upon suitable actuation of the mandrel shaft 173. The top mandrel segment 172 is suitably secured as by silver solder to a mandrel arm 175 which is slidably disposed in the slot 174 of the mandrel shaft 173. The mandrel shaft 173 is slidably guided in the corresponding spacer 169 and is rotatable therein.

Slidable in the rear head plate 133 is a mandrel tube 180 (Fig. 11) which receives the left-hand end (as viewed in Fig. 11) of the mandrel shaft 173 and is provided with a hole 181 into which a lug 182 on the left-hand end of the mandrel arm 175 is inserted. Thus the mandrel arm 175 moves longitudinally with the mandrel tube 180 as the latter is moved in a longitudinal direction relatively to the winding head frame. Since the mandrel shaft 173 is slidable relatively to the mandrel tube 180, it also is slidable relative to the mandrel arm 175.

Two limit positions for the movement of the mandrel tube 180 relatively to the rear head plate 133 are determined respectively by two detents formed by a pair of spaced circumferential grooves 182, 183 in the mandrel tube 180 adapted to receive therein a ball 184 which is slidable in a bore 185 in the rear head plate 133 and urged outwardly by a spring 186 seated against a screw plug 187.

A stop sleeve 188 also may be provided which is freely slidable on the mandrel tube 180 and is adapted to cooperate with a stop collar 189 rigidly secured on the inner end of the mandrel tube 180 to limit outward movement of the mandrel tube relatively to the rear head plate 133.

The mandrel tube 180 carries at its outer (left-hand) end a collar 190 which is adapted to cooperate with actuating means hereinafter described for moving the tube 180 longitudinally in the winding head frame.

As will be explained more in detail hereinafter, each mandrel is formed by two segments which are relatively movable in a longitudinal direction in order to permit the strips to be engaged therebetween prior to the rotation of the mandrel to wind the strip. The lower segment 171 is projected into winding position, then the strips are carried across the lower segment, whereafter the upper segment is projected into winding position. The segments are so dimensioned and positioned that when they both are projected into position, they grip the strips between them, this action being accomplished by the aid of the mandrel guides. As above stated the mandrel segments are complementally tapered along their flat surfaces, which permits the upper mandrel segment to be withdrawn from the finished roll without disarranging the inner turns of material, leaving the roll on the lower mandrel segment until it is withdrawn.

The mandrel shaft 173 is moved longitudinally by a mechanism including a collar 191 rigidly secured on the mandrel shaft 173 and rotatable therewith. The collar 191 is formed with a groove 192 which receives the bifurcate end of a wrapper finger 193 (Figs. 4 and 6) which is secured to the end of a guide rod 194 slidable in a tubular guide 195 secured in the front and middle head plates 131 and 132. The wrapper finger 193 is movable longitudinally by means hereinafter described to project or retract the mandrel shaft 173 and bottom mandrel segment 171. Where the machine is to be used to wind larger capacitors, the wrapper bar 196 is removed and the guide rod 194 is replaced by a wrapper bar (not shown) of such length as to project from the guide 195 and past the guides 162a and 162b, thus locating the wrapper bar (not shown) at a greater radius from the axis of the winding head.

The wrapper finger 193 also is secured to one end of wrapper bar 196 which projects through aligned openings in the front and middle head plates 131 and 132 and the head bearing plate 136, and is adapted to be projected into position beyond the outer mandrel guide 162b to aid in the winding operation.

The two mandrels 170 are adapted to be rotated by rotation of the winding drive shaft 155. To this end a driving gear 200 (Figs. 5 and 6) is nonrotatably secured to the winding drive shaft 155 as by a set screw 201 and meshes with drive gears 202 nonrotatably mounted on the mandrel shafts 173 respectively. Each of the latter gears 202 (Fig. 12) is provided with a hub 203 having diametrically opposed slots 204 and is slidably but nonrotatably carried thereon by a gear clip 205. The gear clip 205 is of generally split ring form and has one end turned in to form an ear 206 which end extends radially inwardly. The gear clip 205 is carried on the hub 203 and has the ear 206 extending through one of the slots 204 and into the slot 174 in the mandrel shaft 173. The gears 202 thus are slidable relatively to their respective mandrel shafts 173 but upon rotation serve to rotate the shafts. The gears 202 are retained in longitudinally fixed position relatively to the adjacent middle plate 132 so that upon longitudinal movement of either of the mandrel shafts 173 the corresponding gear is not displaced longitudinally out of meshing engagement with the gear 200. To this end a gear retainer 210 is disposed in position receiving the end of the winding drive shaft 155 and is held by a screw 211 threaded into one of the tie plates 134. The gear retainer 210 is of such size and is so positioned that it extends across the outer end faces of the gears 202 and prevents them from being displaced outwardly away from the adjacent middle head plate 132. The gears 202 are restrained against inward movement by the middle head plate 132.

From the foregoing it will be seen that when the winding drive shaft 155 is rotated it rotates the gear 200 which drives the gears 202 to rotate the corresponding mandrel shafts 173. Because of the arrangement of gears both of the mandrel shafts are rotated in the same direction. Moreover, since the gear 200 and the gears 202 have the same number of teeth, the planetary action is such that the two mandrel shafts 173 are similarly positioned in each of the two positions of the winding head 130. Thus, the mandrel segments 171 and 172 are in the same relative positions, that is top and bottom, in either of the two positions of the winding head.

The winding head 130 is generally symmetrical about a longitudinal medial plane and there are two similar mandrels 170 and associated elements. For convenience in describing the mandrel head 130 and its operation the mandrel 170 which is at the forward portion of the winding head, when the latter is in either of its two stop positions, is referred to as the "forward" mandrel and the other mandrel is referred to as the "rearward" mandrel. The elements associated with each of the mandrels 170 respectively are correspondingly designated as "forward" and "rearward" elements. It will be understood that such designations refer only to the positions of the mandrels and other elements when the winding head is in either of its two positions referred to, and that upon rotation of the winding head through 180 degrees the positions of the mandrels and other elements are reversed.

The mandrels 170 are projected and retracted by four air-driven mechanisms 1, 2, 3 and 4 (Fig. 2) (hereinafter sometimes referred to as "cylinders"), and certain other elements of the machine, as elsewhere herein explained, are actuated by generally similar cylinders 5, 6, 7, 8 and 9. One of the cylinders is described now in order to facilitate an understanding of the actuation of the mandrels 170 thereby.

All of the several cylinders are substantially similar in construction and operation, and therefore only one such cylinder will be described in detail. However, it will be understood that the several cylinders may vary in dimensions in view of their differing load and travel requirements. Also the cylinders vary as indicated elsewhere herein in respect to the driving elements which are connected thereto in order to adapt the cylinders for the several different uses to which they are applied.

Referring now particularly to Fig. 23 the cylinder includes a cylinder proper 215 having an inlet cap 216 threaded to one end and serving to attach to that end of the cylinder 215 a connector 217 for connecting an air inlet pipe 218 to the cylinder. A bearing cap 219 is threaded on to the other end of the cylinder 215 and serves to close that end of the cylinder except for an opening (not shown) in the bearing cap in which a piston rod 220 is slidable. At its inner end the piston rod 220 carries a piston-like air sealing element or piston 221 formed of suitable flexible sealing material such as leather, and a spring 222 is compressed between the piston 221 and the bearing cap 219 to normally urge the piston rod 220 toward the inlet end of the cylinder.

The end of the piston rod 220 which projects from the bearing cap, serves to carry a suitable actuating element which as above indicated, is so formed as to suitably perform duties to be required of the cylinder.

The cylinder 1 (Fig. 2) is adapted to project the lower segment 171 of the rearward mandrel 170, and to that end is provided with a pusher head 230 carried by the piston rod and disposed in alignment with the rearward wrapper finger 193 which actuates the rearward mandrel shaft 173. When the cylinder 1 is energized its piston rod is projected and causes the pusher head 230 to engage and move to the right (as viewed in Fig. 2) the rearward wrapper finger 193 and thereby project the rear lower mandrel segment 171.

The cylinder 2 is adapted to project the rearward upper segment 172 of the rearward mandrel 170 and therefore is formed with a pusher head 231 similar to the pusher head 230 of the cylinder 1, and is disposed in alinement with the collar 190 on the rear mandrel tube 180. Energization of the cylinder 2 causes its piston rod to be projected and move the pusher head 231 into abutment with the collar 190 and move the same to the right (as viewed in Fig. 2) and thus project the rearward upper mandrel segment 172.

The cylinder 3 is provided for the purpose of retracting the forward upper segment 172 of the forward mandrel 170. The cylinder 3 therefore is disposed parallel to the direction of movement of the forward mandrel 170 but is offset slightly therefrom. The cylinder 3 is provided with a finger rod 232 attached as by a connector 233 to the projecting end of the piston rod and carrying at its free end a finger 234 adapted to engage the inner face of the collar 190 on the forward mandrel tube 180. The finger rod 232 slides in a guide 235 fixed relatively to the cylinder. The arrangement is such that when the cylinder 3 is energized its piston rod is moved to the left (as viewed in Fig. 2) causing the finger 234 to engage the collar 190 and move the forward mandrel tube 180 to the left, thus retracting the upper mandrel segment of the forward mandrel.

A delay release mechanism 240 (Figs. 1 and 19) is provided which includes a delay release pin 241 which is movable between a projected and retracted position and which in its projected position serves as a stop to prevent the outward movement of the forward wrapper bar finger 193 and consequent retraction of the forward mandrel shaft 173. The delay release pin 241 is slidably mounted for vertical movement in a guide tube 242 secured in the main shelf 101. The delay release pin 241 is normally urged toward projected (upper) position by a spring 243 secured at one end to a fixed anchor screw 244 and at the other end to a screw 245 which serves to connect the delay release pin 242 to a core or plunger 246 of a solenoid 247 secured below the main shelf 101. The delay release pin 241 thus is normally urged into projected position and serves as a stop to present the forward wrapper bar finger 193 from being retracted. However, upon energization of the solenoid 247 in the manner elsewhere herein explained, the delay release pin 241 is retracted to permit the forward wrapper bar finger 193 to be moved to its retracted position.

The cylinder 3 is adapted to actuate a microswitch 250 (Fig. 2) which controls the energization of the delay release solenoid 247. The microswitch 250 is normally open and secured on the main shelf 101 in the path of movement of the piston rod of the cylinder 3. When the cylinder 3 is energized its piston rod engages and closes the microswitch 250 to thereby energize the delay release solenoid 247, which retracts the delay release pin 241 to permit retraction of the forward wrapper finger 193 and the connected wrapper bar 196 and lower mandrel segment 171. The electrical connections to effect this result are described hereinafter. A stop 1250 is associated with the microswitch 250 and piston rod of the cylinder 3.

The cylinder 4 is provided for the purpose of retracting the lower segment 171 of the forward mandrel 170 and is generally similar in construction to the cylinder 3. The cylinder 4 has a finger 251 adapted to engage the inner face of the forward wrapper finger 193. When the cylinder 4 is energized it moves its piston rod to the left and causes its finger 251 to move the wrapper finger 193 and connected members to the left (as viewed in Fig. 2) to retract the lower segment of the forward mandrel 170.

The cylinder 4 is adapted to actuate a normally open microswitch 252 (Fig. 2) which controls the operation of a head stop mechanism 253 hereinafter described, the function of which is to hold the winding head 130 in either of its two positions for the winding operation as hereinafter explained. The microswitch 252 is secured on the main shelf 101 in the path of movement of the piston of the cylinder 4, whereby upon energization of that cylinder the microswitch is closed. The microswitch 252 is electrically connected to the head stop mechanism 253 by a circuit which is described hereinafter. A stop 1252 is associated with the piston of the cylinder 4.

The winding drive shaft 155 is driven at periodic intervals to rotate the shaft a predetermined number of rotations during each period of actuation so as to rotate the mandrels and wind on to the rearward mandrel a predetermined number of turns of foil and paper, after which the winding drive shaft 155 is halted and the winding head 130 rotated through 180 degrees to reverse the positions of the mandrels and to bring the other mandrel into position for winding.

The drive mechanism for the winding drive shaft 155 includes a winding motor 260 (Figs. 2 and 15) secured on the main shelf 101 and connected through a drive now to be described to the winding drive shaft 155. A drive pulley 261 is rigidly secured on the motor shaft 262 and is connected by a belt 263 to a driven pulley 264 which floats on a drive shaft 265 connected rigidly by driving connection 266 to one end of the winding drive shaft 155. The drive shaft 265 is journaled in spaced bearings 267 and 268 rigidly supported on the main shelf 101. One of the bearings 268 also serves to journal the adjacent end of the mandrel guide shaft 160, and supports the winding drive shaft 155 carried therein.

The driven pulley 264 is normally urged into friction driving engagement with a clutch plate 270 by a coil spring 271 bearing against a collar 272 secured to the driving shaft 265. A sprocket 273 is secured to the driving shaft 265 and is connected by a chain 274 to a sprocket 275 (Fig. 16) which floats on the motor shaft 262. The sprocket 275 carries four pins or abutment members 276 which are circumferentially spaced about the axis of the sprocket and project therefrom in a direction parallel to the axis. Four pins are provided because the sprocket 275 has four times as many teeth as the sprocket 273. These pins are so spaced that on any revolution of he mandrels they will be stopped in the correct position for operations of moving the mandrels in or out.

A stop mechanism 280 (Figs. 15 and 16) is provided for halting the rotation of the sprocket 275 after a predetermined number of revolutions of the winding drive shaft 265. The stop mechanism includes a pin or abutment member 281 slidable in a guide into and out of the path of movement of the several pins 276 carried by the sprocket 275. The stop pin 281 is normally urged outwardly into projected position by a pair of coil springs 282 secured at one end to a guide bracket 283 and at the other end to a screw 284 secured to the pin 281 which connects the stop pin to a core or plunger 285 of a solenoid 286. The solenoid 286, when energized, draws the stop pin 281 into retracted position out of the path of movement of the pins 276. Means are provided for preventing reverse movement of the sprocket 275 after one of the pins 276 carried thereby strikes the stop pin 281. Such means includes a stop 290 formed of resilient sheet metal and supported at one end on a mount 291 so that the free end of the stop 290 is bent into the path of movement of the pins 276 carried by the sprocket 275, but is pushed out of the way by the pins 276 as they rotate. In other words, the stop acts in the manner of a dog and permits the sprocket 275 to rotate in one direction without interference but engages the nearest pin 276 when the sprocket 275 is halted by the stop pin 281, to thereby prevent reverse movement of the sprocket. This is necessary since the rotation of the head 130 reverses the tension on the sprocket chain 274 and at the end of the head rotation, the pin 276 will be restrained by stop 290. A stop guide or damper 292 is provided for limiting vibration of the stop 290 and includes a straplike member of spring material and having a head 293 formed of resilient material such as rubber. This also prevents the stop 290 from bending out of the path of the pins 276 when the head 130 is rotated. The stop guide 292 is secured at one end suitably as by attaching it to a mount 294 which serves to support the solenoid 286 with the other and free end bearing against the stop 290 at a point inwardly from the free end, and out of the path of movement of the pins 276.

The drive chain 274 is trained around a sprocket 300 carried on a shaft 301 of a counter 302 whereby the revolutions of the drive shaft 265 are counted. The counter 302 as elsewhere explained operates after a predetermined number of revolutions of its shaft to deenergize the winding motor 260, and at the same time to deenergize the solenoid 286, which permits the stop pin 281 to be projected. The motor, due to its inertia, as well as the inertia of the members connected positively thereto, does not halt instantaneously and therefore the pulley 261 carried on the motor shaft 262 and the pulley 264 connected thereto by the belt 263 continue to rotate. However, the stop pin being projected into the path of the pins 276 halts the sprocket 275 at the moment that the nearest oncoming pin 276 strikes the stop pin 281. Since the sprocket 275 is positively connected to the sprocket 273 by the chain 274, the drive shaft 265 and the mandrel winding shaft 155 are immediately halted; also the counter shaft 301 is likewise immediately halted. Since the clutch plate 270 is in friction engagement with the sprocket 264 the latter is not halted abruptly but is gradually halted as is the motor 260.

The counter 302 preferably embodies a productimeter 303 of known construction such as that manufactured by Durant Manufacturing Company, Milwaukee, Wisconsin, and designated as "Durant No. 3R7QRS–CL." Since the construction of the productimeter is well known the details are not shown or described except as is necessary to an understanding of the cooperation with the mechanism which is actuated by the productimeter. The productimeter 303 is arranged to actuate a two-way microswitch 304. The microswitch 304 (Figs. 33 and 34)

has a contact *o* controlling the cam motor (Fig. 33) circuit and a contact *c* controlling the mandrel motor circuit (Fig. 34), both of which are described hereinafter. When the microswitch 304 is actuated in one direction (downwardly as viewed in Fig. 15) it opens the circuit through the contact *c* and closes the circuit through the contact *o*.

It will be understood that the productimeter (Figs. 15, 43, 44 and 45) has the usual discs 305 which are rotated upon rotation of the productimeter shaft 301 and have notches 306 positioned to receive rollers 307 for controlling the movement of pivotally mounted, spring-urged arm 308 for actuating the microswitch 304. Upon rotation of the productimeter shaft 301 through a predetermined number of revolutions the rollers 307 drop into the notches 306 to permit the arm 308 to actuate the microswitch to open the contact *c* to thereby halt the mandrel motor 260.

The productimeter 303 is reset for another cycle of counting and the microswitch is actuated to close on the contact *o* for energizing the cam driving motor by a reset mechanism. The reset mechanism includes a reset lever 310 pivoted to the productimeter casing by a hinge 311 and carrying a reset arm 312 engageable with the microswitch 304 for actuating it in a direction to close it on the contact *c* and open the contact *o*. A cam arm 313 is carried at the free end of the reset lever 310 and is in the path of movement of an arcuate cam 314 carried by a reset handle 315. The reset handle 315 is mounted for pivotal movement on the productimeter casing 316 and is connected to the productimeter mechanism in the usual manner (not shown) for resetting it. The handle 315 also is rigidly connected to the cam 314 for rocking the same about the pivot of the reset handle 315 to thereby engage the cam arm 313 and rock the reset lever 310. When the reset handle 315 is rocked in the other direction the reset lever is rocked and causes the reset arm 312 to actuate the microswitch to close the contact *o* and open the contact *c*.

The reset handle 315 is actuated by a cylinder 7 (Fig. 17) having an elongate piston and actuating rod 320 pivoted to the end of the reset handle 315, a retracting spring 321 being provided for normally retracting the piston rod 320 and rocking the reset handle 315 in a counterclockwise direction (as viewed in Fig 17).

An electric timer (not shown) of known construction may be employed in place of the productimeter for starting and stopping the winding motor. Such a timer does not actually count the number of revolutions of the winding shaft but serves to deenergize the winding motor after a predetermined period. Since the winding shaft is rotated at a predetermined number of revolutions per unit of time, the timer thus serves to determine the number of revolutions of the winding shaft in each cycle. The timer (not shown) is started when the winding motor is energized and, after a predetermined period of time, actuates the microswitch 304 to deenergize the winding motor. The timer (not shown) is reset by the actuation of the cylinder 7 as above described.

The rotating motor 350 (Figs. 2 and 24) for the winding head 130 is constantly rotated to constantly exert a driving torque on the winding head drive shaft 150. The winding head 130 however is periodically halted in each of its two positions for winding by the head stop mechanism 253 hereinafter described.

The motor 350 is connected through a belt drive including a pulley 351 on the motor shaft, a belt 352, and a pulley 353 to a speed reducer 354. The speed reducer is drivingly connected to a clutch 355 comprising clutch members 355 and 356, one of which (355) is rigidly connected to the shaft 357 of the speed reducer 354 and the other (356) of which floats on the shaft and is resiliently urged into friction driving engagement with the other clutch member with a spring 358 bearing against a collar 359 secured on the speed reducer shaft 357. Rigidly secured to the clutch member 356 is a pulley 360 which drives a belt 361 trained around a sprocket 362 secured on the winding head drive shaft 150.

The head stop mechanism 253 (Fig. 20) includes a stop pin 370 which is pivotally supported as by a pivot pin 371 in a housing 372 having feet 382 and an upright portion 383 formed with a vertically extending notch or groove 373. Pivotally connected to the stop pin 370, as by a pin 374, are a pair of arms 375 which are connected to a screw 376 which serves to connect the pin to the core 377 of a solenoid 378. The pin 370 is normally maintained in its vertical position against the inner wall of the groove 373 by a pair of springs 379, each connected at one end to the screw 376 and at the other end to screws 379 extending vertically from the feet 382 respectively. The screws 379 also preferably serve to attach the housing to the main shelf 101. The solenoid 378 is attached to the main shelf 101. Threaded into the upper end of the stop pin 370 is a stop pin screw 380 which is adjustable therein and is adapted to be locked in position by a lock nut 381.

The head stop mechanism 253 is so positioned that the head of the stop pin screw 380 lies in the path of movement of the guides 195 (Fig. 6) and is adapted to halt the winding head 130 in either of its two positions and thus establish such positions. The stop pin 370 is adapted to be rocked about its pivot pin 371 and out of its vertical position by the energization of the solenoid 378. In such latter position the stop pin 370 is out of the path of rotation of the guides 195 and therefore does not interfere with the rotation of the winding head 130. As previously explained, the winding head driving motor 150 is constantly rotated and thus the winding head 130 would likewise be constantly rotated, except for the fact that the stop pin 370, when in its vertical position, engages the winding head and prevents such rotation. Accordingly, whenever the solenoid 378 is energized to rock the stop pin 370 out of vertical position the winding head will be rotated. The energization of the head stop solenoid 378 is controlled by the microswitch 250 hereinabove referred to.

Secured on the portion of the head drive shaft 150 which projects beyond the bearing 151 are cam arms 390 (Fig. 24) and 391. The cam arm 390 carries at each end a pair of elongated cams 392 adapted upon suitable rotation of the head drive shaft 150 to engage and close a normally open microswitch 393 which controls the operation of the cam driving motor 394, hereinafter described.

The other cam arm 391 has two opposite, reduced cam surfaces 395 adapted to engage, upon appropriate rotation of the arm, a normally closed microswitch 396 which controls the operation of the winding motor.

Means are provided for bringing together the several portions of the strips P and F which extend across the rearward lower mandrel segment 171 prior to the time that the rearward upper mandrel segment 172 is projected into position overlying the lower mandrel segment 171, in order to insure that all of the overlying strips are engaged between the lower and upper mandrel segments. As will be seen from Fig. 38 the strips are spaced vertically at this time and it would not be engaged between the mandrel segments upon the movement of the upper mandrel segment into projected position, unless the strips were brought together.

The aforementioned means takes the form of a hold-down bar 400 (Figs. 3 and 28) of sufficient width to extend across the strips of foil and paper. The hold-down bar 400 is supported in position above the winding head 130 and in vertical alignment with the space between the rearward mandrel 170 and wrapper bar 196. The hold-down bar 400 is secured to the end of the piston rod of a cylinder 9 which is suitably supported as by straps 401 on the panel 104. A guide bracket 402 preferably is provided which is rigidly secured to the panel 104 and serves to guide the piston rod, and hold-down bar carried thereby, along a vertical path. Guide rods 403 secured to the ends of the hold-down bar 400 may be provided which are slidable in the guide bracket 402.

An offset and cutter mechanism 410 (Figs. 1, 18 and 19) is provided which is automatically actuated at the appropriate time to offset or draw out an additional length of the lower foil and paper strips, and later to sever from the remainder of the strip the foil and paper which has been wound. The offset and cutter mechanism 410 is supported on the mandrel guide shaft 160 for sliding movement between a retracted position away from the winding head 130 (as seen in Figs. 1 and 2) and a projected position wherein it is located generally above the projected mandrel guides. The offset and cutter mechanism also has pivotal movement about the axis of the mandrel guide shaft 160. The offset and cutter mechanism 410 includes a cutter bar 411 in which is secured a sleeve 409 which mounts the mechanism on the mandrel guide shaft 160. Adjustably secured in and depending from the cutter bar 411 is a rear stop leg 412 having a foot 413 which preferably is formed with a tip formed of resilient material such as rubber. A forward stop leg 414 is secured to and projects angularly from the forward end of the cutter bar 411. The leg 413 is formed similarly to the leg 412 but is shorter in length. The two stop feet just described are positioned to limit pivotal movement of the cutter bar 411 about its axis in two positions, namely, an active position (Fig. 19) and an inactive position (Fig. 17).

The cutter bar 411 carries an offset bar 415 which preferably is integral with a plate 415' (Fig. 17) detachably secured to the cutter bar 411. The offset bar 415 projects laterally from the cutter bar 411 in a direction toward the winding head 130.

A plurality of cutter blades 416 are supported for movement with and vertical reciprocation with respect to the cutter bar 411. The blades 416 are carried rigidly by a guide bracket 417 having an arm portion 418 to which the blades 416 are rigidly secured, and a hollow body portion 419 which is slidable on a guide member 420 rigidly secured to and upstanding from the cutter bar 411. The guide bracket 417 has an arm 421 extending laterally therefrom and a limit screw 422 is threaded into and depends from the arm 421 and extends through the cutter bar 411 whereby the head (not shown) of the screw 422 is adapted to abut the cutter bar 411 and limit upward movement of the guide bracket 417 on the guide 420. A coil spring 423 compressed between the lower surface of the arm 421 and the upper surface of the cutter bar 411 yieldingly urges the bracket 417 and the blades 416 carried thereby into upper position.

The offset and cutter mechanism 410 is normally retained in its retracted position away from the winding head 130 by a cylinder 3 (Fig. 2), the piston rod of which is connected to the cuter bar 411 by a finger 424 (Fig. 17). When the cylinder 8 is energized it urges the offset and cutter mechanism 410 to projected position (to the left as viewed in Figs. 1 and 2) into operative relation with the mandrel guides 162a and 162b. The offset and cutter mechanism 410 normally is maintained in inoperative position (as seen in Fig. 17) by a weight 425 secured to the forward end portion of the cutter bar 411 and it remains in such position both when it is retracted and when it is projected, except where it is urged out of such position by means now to be described.

The offset and cutter mechanism 410 is rotated (clockwise as viewed in Fig. 19) into active position by a cylinder 5 having a foot 426 carried at the outer end of its piston rod and positioned to engage and depress the rear end portion of the cutter bar 411 when the offset and cutter mechanism 410 is in its projected position.

The cutter blades 416 are depressed by depressing the guide bracket 417 against the force of the spring 423, by means of a cylinder 6 having a foot 427 secured to the outer end of the piston rod and adapted to engage the arm 421 of the guide bracket 417. When the cylinder 6 is deenergized and returns to its retracted position, the guide bracket 417 and cutter blades 416 carried thereby are returned to their upper position by the spring 423. Thereafter, and at the appropriate time the cylinder 5 is deenergized to permit the cutter bar 411 to be rocked into its inoperative position by the weight 425. Thereafter the cylinder 8 is deenergized to return the offset and cutter mechanism 410 to its retracted position.

At the conclusion of the winding of each capacitor, the free end of the outer paper strip is glued to the next inner turn in order to retain the wound capacitor in tightly rolled condition. To this end a gluing mechanism 430 is provided which is automatically actuated, and preferably by the turning movement of the winding drum. Also it is desirable to mark the wound capacitor to show which extended foil is the outside foil so the foil strips may be identified properly for the connection of conductors thereto. Consequently, marking means is provided as a part of and actuated along with the gluer.

Referring particularly to Figs. 19 and 25 the gluer includes a hinge leaf 431 secured to the main shelf 101 and three leaves 432, 432a and 432b independently pivoted to the leaf 431, which are limited in their upward movement by a stand or stop 433 inclined at an angle to the main shelf 101. Carried by each of the hinge leaves 432 and 432a is an applicator unit 434 for each of the capacitors to be wound, each of which unit is similar and each of which is adapted to be moved into and out of operative relation with one of the two capacitors respectively being wound. Each applicator unit includes a wiper arm 435 secured at one end to its hinge leaf 432 (or 432a) and having its other end free. A glue wiper head 436 is suitably secured to the arm 435 adjacent its free end and projects therefrom. The wiper head 436 includes a rigid, hollow head member 437 connected to a flexible tube 438 formed from a suitable material such as plastic. An adapter 439 which may be formed of one or more sections of rigid tubing may be connected between the wiper head 436 and the tube 438. A capillary wiper element 440 (Fig. 26), which preferably is formed by wicking, extends in the head member 437 and projects through a small opening 441 in the under side. The flexible tube 438 is connected to a tank 442 (Fig. 2) which is suitably supported at a suitable location on the frame 100. The tank 442 contains a suitable adhesive in liquid form (hereinelsewhere referred to as "glue") which is supplied through the flexible tube 438 and the head member to the wiper element 440 in order to maintain the latter saturated. To this end the tank 442 is maintained at a sufficient height so that the glue will flow by gravity to the wiper element 440. Where two applicator units are employed they may be connected to the same tank as shown in Fig. 2.

The ink or other marking fluid is applied by an arrangement generally similar to that which applies to the glue except that the unit preferably is somewhat smaller in size. The unit 445 (Fig. 27) includes a wiper head 446 of tubular form and containing a wiper element 447 formed of wicking which extends through a small opening 448 in the side of the wiper head 446. The wiper head is connected by a flexible tube 449 leading to a tank 1450 containing ink or other marking fluid and which preferably is located adjacent the glue tank 442.

A lifting arm 450 is rigidly attached to the hinge leaf 432b and extends over the front head plate 131 of the winding head 130. A strap or arm 450a is secured rigidly to the lifting arm 450 and extends across behind the arm 435. Thus, while the applicator units 434 are free to raise independently of the arm 450 and each other, the applicator units 434 both are lifted when the arm 450 is raised.

The lifting arm is so shaped that when the winding head is in its halted position for winding, the glue wiper head 436 and the ink wiper head 445 are in position with the wiper elements 440 and 447 bearing on the upper surface of the uppermost strip of the roll R carried by the forward mandrel 170 as illustrated in Fig. 36. However, upon rotation of the winding head 130 as elsewhere described, the lifting arm 450 is raised by the front head plate 131 to raise the applicator units 434 and lift the glue wiper heads 436 and the ink wiper heads 445 away from the forward mandrel 170 a distance sufficient to permit the rotation of the winding head 130 without interference from the wiper heads 436 and 445.

Instead of controlling the raising and lowering of the applicator units 434 by the arm 450, a solenoid mechanism (not shown) may be employed which is energized in suitably timed relation by the machine. Thus, the applicator units 434 may be lowered at the proper time so as to contact the rolls of material being wound only during the latter portion of the winding cycle.

The several cylinders 1 to 9, and a microswitch 460 (Fig. 29) hereinafter described, are controlled in appropriate sequence in order to perform the various operations necessary to wind the capacitors. To this end a cam controller 461 (Fig. 29) is provided which is located on the lower shelf 102. The controller 461 includes an electric motor 394 connected through a gear reduction 462, and a drive 463 to a speed reducer 464, the shaft 465 of which is coupled to a cam shaft 466, the other end of which is journaled in a bearing 467, mounted on the lower or cam shelf 102.

The cam drive motor 394 is energized in timed relation, and as elsewhere herein explained, to rotate the cam shaft 466. It is desirable that the cam shaft 466 be halted at the desired time, without any overriding. To this end, the drive 463 between the motor 394 and the speed reducer 464 includes a driving pulley 470 on the shaft of the gear reduction unit 462, a pulley 471 (Fig. 22) loosely mounted on the shaft 465 of the gear reducer 464 and a belt 472 trained around the pulleys 470 and 471. A clutch plate 473 is nonrotatably secured to the shaft 465 by a pin 474 which projects radially outwardly beyond the hub of the clutch plate 473, and a spring 475 urges the pulley 471 into frictional driving engagement with the clutch plate 473.

Disposed adjacent the end of the gear reducer shaft 465 is a brake unit 480 including a solenoid 481 having a core or plunger 482 to which is secured as by a screw 483, a stop pin 484 which is slidable in a guide 485 secured to the cam shelf 102. The plunger 482 and the stop pin 484 are normally urged into outer or projected position by a pair of springs 486, each secured at one end to the screw 483 and at the other end to the guide 485. In its outer or projected position the stop pin 484 extends into the path of the rotation of the pin 474 and thus serves to prevent rotation of the speed reducer 464 and the connected cam shaft 466. When the solenoid 481 is energized as described elsewhere herein, it retracts the plunger 482 to withdraw the pin 484 from the path of the pin 474 and permit rotation of the shaft 466 and cams carried thereby.

Supported on and driven by the cam shaft 466 are cams 11 to 20 inclusive, all of which preferably are similar in construction but provided with variously shaped cam lugs thereon. Each of the cams 11 to 19 inclusive is arranged to actuate a valve, all of which are similar. One of the valves 490 is shown in detail in Fig. 30. The valves 490 are all connected at one side to a source of compressed air (not shown) by a pipe 491 in which is located a pressure regulator 492. The pipe 491 constitutes a header connected to each of the valves respectively through manually controlled valves 493 by which the pressure on each valve may be adjusted. A single valve 494 for controlling the entire header may be provided. Each of the valves 493 is connected to one of the air cylinders above mentioned by air pipes 501–509, respectively. The connections are such that cams 11 to 19 inclusive control air cylinders 1 to 9, respectively.

Referring now particularly to Fig. 31, each cam includes a hub 510 and a pair of cam parts 511 and 512. Each cam part is of generally disc form, one (511) being formed as a complete disc having a cam lug 513 projecting from the periphery. The disc 511 also is formed with a central opening 514 for mounting it on the cam shaft and an arcuate slot 515 for a purpose hereinafter described. The other cam part 512 is formed as a generally semi-circular disc having a projecting cam lug 516 and has a semi-circular central notch 517 and paired arcuate slots 518. The two cam parts 511 and 512 are secured to each other and to the hub 510 by bolts 519 which extend through openings 520 in the hub 510 and through the slots 515 and 518 in the cam parts 511 and 512, respectively. Thus it will be seen that the two cam parts 511 and 512 may be adjusted angularly with respect to the hub 510 and to each other to provide a wide range of adjustment in the length of the cam lug provided jointly by the lug portions 513 and 516 of the two cam parts.

The valve 490 (Fig. 30) includes a block or body 1520 having two aligned bores 521 and 522 connected by a reduced, circular passage 523, the inner walls of the two bores 521 and 522 being cut back as illustrated in order to provide valve seats 524 and 525. An inlet port 526 leads into the lower bore 521 and a counterbore 527 is connected thereto for attaching the inlet pipe 528. An outlet port 529 extends through the side wall of the reduced passage 523 and a counterbore 530 is provided for connecting the pipe 505 leading to the cylinder 5. Valves 531, 532 which are formed from suitable sealing material such as rubber are disposed at the inner ends of the two bores 521 and 522, respectively in position to alternately close the corresponding ends of the reduced passage 523. The valves 531, 532 are spaced apart at predetermined positions by a plunger 533, preferably of square cross section which insures that only one or the other of the valves 531, 532 may be closed at any time. A bleed hole 534 extends from the upper bore, above the upper position of the upper valve, to the exterior of the block 520 to provide an exhaust to atmosphere from the reduced passage 523 when the upper valve 532 is open. The valves and plunger are normally urged resiliently into their upper position with the lower valve 531 closed by a spring 535 seated against a screw plug 536 threaded into lower bore 521 and carrying a washer 537 which seals the outer end of the bore 521.

A top plunger 538 positioned to bear against the upper valve 532 is slidably guided in a nut 539 threaded in the open end of the upper bore 522. The top plunger 538 is adapted to be urged downwardly by an adjustable screw 540 carried by an arm 541 pivotally supported from the valve block 520 by a hinge member 542 secured to the block.

When the valve 490 is in closed position, with the actuating arm 541 in the position shown in Fig. 30, the lower valve 531 closes the reduced opening 523 and air cannot pass through the valve into the connected cylinder 5. When the cam 15 is rotated to a position wherein its cam lug depresses the actuating arm 541, the upper valve 532 is closed and the lower valve 531 is opened, to allow air to pass to the corresponding cylinder 5, thus actuating the cylinder. When the cam lug passes off the actuating arm 541 the lower valve 531 is closed and the upper valve 532 is opened, thus allowing air to bleed from the cylinder through the reduced passage 523, the upper bore 522 and the bleed hole 534, thereby permitting the piston rod of the cylinder to be returned by the cylinder spring.

Mounted on the cam shelf 102 in position to be actuated by the cam 20 is a normally closed microswitch 460 which serves to deenergize the cam driving motor 394 at the completion of the winding operation, to thereby halt the cam controller 461, while the winding head 130 is rotated from one to another of its two positions, in preparation for a new winding operation. The microswitch 460 is connected in the cam motor circuit in a manner hereinafter explained in detail in connection with Fig. 33.

The several electrical circuits for energizing the motors and solenoids are illustrated by circuit diagrams in Figs. 33, 34 and 35. The several circuits are all energized from a suitable source of current, and preferably are connected to a junction box 600 which is suitably mounted on the frame of the machine and has bus bars 601 and 602, which are connected to the source of current (not shown).

The cam motor circuit (Fig. 33) includes, in series, across the bus bars 601 and 602, a manually operable toggle switch 603, the cam motor 394, across which the brake solenoid 481 is connected in parallel, the normally open microswitch 393, which is controlled by the cam arm 390 on the winding head shaft 150, and the side of the microswitch 304 which includes the contact o. The normally closed microswitch 460 which is controlled by the cam 20 of the controller 461, is connected in parallel across the microswitches 393 and 304. A push button starting switch 604 is connected in parallel with the microswitch 393.

When the toggle switch 603 is closed, the cam motor 394 is energized provided the microswitch 304 and either the microswitch 393 or the microswitch 460 is closed. However, if both the microswitch 393 and the microswitch 460 are open, the cam motor circuit may be closed by depressing the push button starting switch 604 and holding it depressed until the cam shaft 466 rotates the cam 20 to close the microswitch 460. If the mandrel motor circuit is closed, the cam motor 304 cannot be energized.

The mandrel motor circuit is illustrated in Fig. 34 and includes, in series, the normally open microswitch 396, a toggle switch 605, the mandrel motor 260, across which the brake solenoid 286 is connected in parallel, and the side of the microswitch 304 which includes the contact c. When the toggle switch 605 is closed, the mandrel motor 260 is energized provided that the microswitch 396 is closed and the microswitch contact c is not open. In other words, the motor 260 is energized so long as the winding head 130 is in the winding position and the productimeter 303 is set to count the number of revolutions of the mandrel driving shaft 155.

Referring now to Fig. 35 the head motor circuit includes, in series, a manual toggle switch 606 and the head motor 350 whereby, so long as the toggle switch 606 is closed the head motor 350 is energized to drive the speed reducer 354. It will be recalled that the head motor when energized rotates the winding head shaft 150 only during the period that the head stop pin 370 is retracted by its solenoid 378. The head stop solenoid 378 and the head stop microswitch 252 are connected in series with each other and in parallel with the head motor 350. The head stop microswitch 252 is normally open and the head stop solenoid 378 is normally deenergized so that the head stop pin 370 is normally in projected position active to prevent rotation of the winding head 130. However, when the cylinder 4, which retracts the forward lower mandrel segment 171, moves to its projected position it closes the microswitch 252 to energize the head stop solenoid 378 and retract the head stop pin 370 which permits the winding head 130 to rotate. Upon retraction of the cylinder 4 the head stop microswitch 252 is opened, thus permitting the head stop pin 370 to be projected and again halt the winding head 130.

Connected in parallel with the head motor 350 is the delay release solenoid 240 and the delay release microswitch 250. The delay release microswitch 250 is normally open with the result that the delay release solenoid 240 is normally deenergized and the delay release pin 251 is projected to prevent operation of the cylinder 4. However, when the cylinder 3 is projected it closes the delay release microswitch 250 to energize the solenoid 240 permitting retraction of the delay release pin 251.

The push button 604 and toggle switches 603, 605 and 606 preferably are conveniently located on a small panel 607 (Fig. 2) at the front of the main shelf 101.

The successive steps in the winding operation are illustrated somewhat diagrammatically in Figs. 36 to 40 inclusive to which reference may be made in connection with the following description of the operation of the machine, as well as to the other figure of the drawings. It will be understood that Figs. 36 to 40 are solely diagrammatic, only certain of the machine elements involved in the winding operation being shown and those being shown in exaggerated form for the purpose of clarity. While the initiation of the actual winding of the strips (which condition is illustrated in Fig. 36) may be considered the beginning of the winding operation, it is believed that a better understanding may be obtained if the description is begun with the initial actuation of the several winding elements into position preliminary to the gripping of the strips by the mandrel segments.

Figure 32:
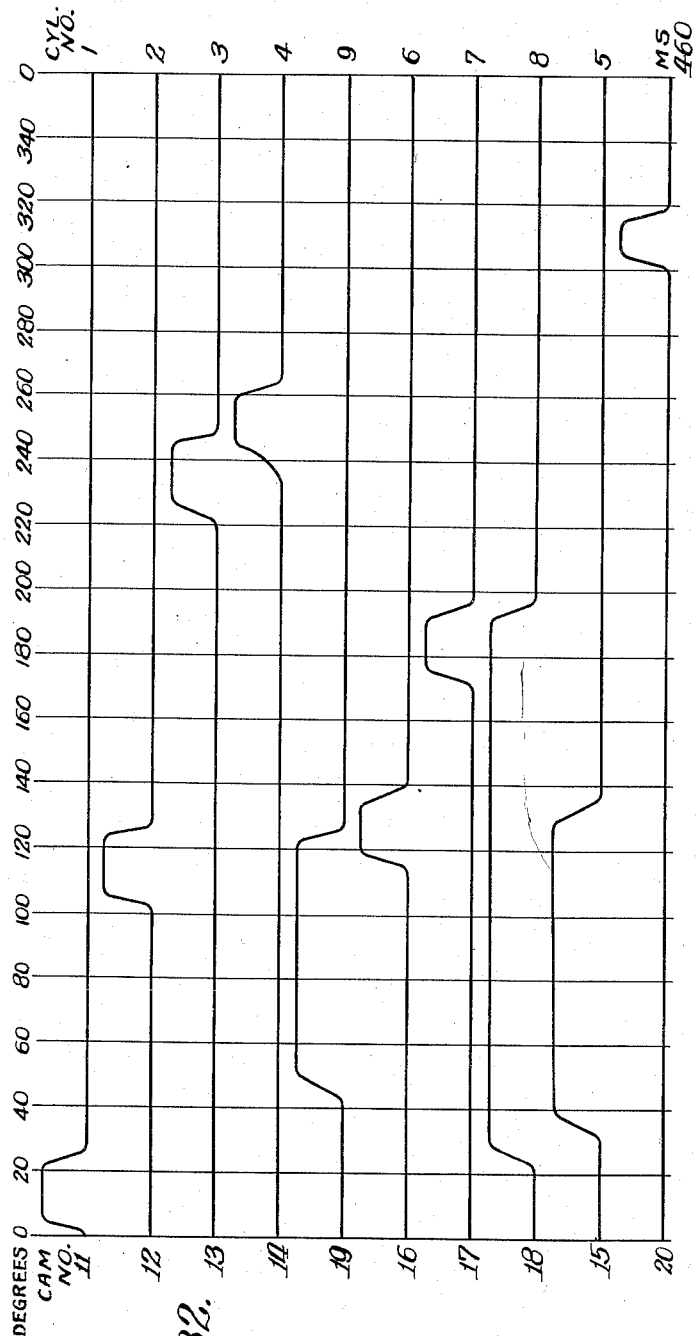
Fig. 32 is a timing chart indicating the timing provided by the cam controller.

In connection with the following description of the operation of the machine, it is believed that it may be helpful to refer to the timing chart shown in Fig. 32, wherein the horizontal lines represent somewhat diagrammatically the developments of the surfaces of the several cams respectively. The cams are identified at the left hand margin of the chart and the cylinders which they operate respectively are identified at the right hand margin.

In order to start the machine all of the toggle switches 603, 605 and 606 (Fig. 2) are closed. Assuming that the winding head 130 has been rotated into one of its two positions of rest, or "winding" positions, wherein it is held against rotation by the head stop pin 370, the cam arm 390 is in position closing the microswitch 393. Accordingly, the cam motor circuit (Fig. 33) is closed and the cam motor 394 (Fig. 29) is energized to rotate the cam shaft 466 and the several cams 11 to 20 inclusive carried thereby. The solenoid 481 is energized to retract the stop pin 484 to permit the cam shaft 466 to be rotated. Preferably, the cam 392 is made sufficiently long so that the cam motor is energized, and the cycle of operations controlled by the cam controller is started slightly before the winding head 130 reaches its next position, thus shortening the total cycle of operation of the machine.

As the cam shaft 466 (Fig. 29) is rotated, the cam 11 actuates the cylinder 1 (Fig. 2) to project the rearward lower mandrel segment 171, the piston rod then returning to its retracted position. In its projected position, the rearward lower mandrel segment 171 underlies all of the foil and paper strips, as illustrated in Fig. 37.

Upon further rotation of the cam shaft 466 (Fig. 29), the cam 18 actuates the cylinder 8 to move the offset and cutter mechanism 410 (Fig. 2) into projected position, the offset bar 415 (Fig. 37) being inserted between the upper foil strip F and the next lower paper strip P, and the cutter blades 416 being moved into position over the two overlying series of foil and paper strips.

Further rotation of the cam shaft 466 (Fig. 29) causes the cam 15 to actuate the cylinder 5 (Fig. 19) to rock the offset and cutter mechanism 410 into active position, thereby depressing the foil offset bar 415 (Fig. 38) and drawing out a corresponding length of the portion of the lower foil and group paper strips which extend between the rearward lower mandrel segment 171 and the mandrel guide shaft 160. This results in the lower foil strip and lower group of paper strips being longer (after the strips are cut) than the upper foil strip. Hence, the lower group of paper strips, as well as the lower foil strip extend beyond the upper foil strip in the finished capacitor, thereby insuring against the ends of the two foil strips coming into contact and causing a short circuit.

The cam shaft 466 (Fig. 29), upon further rotation causes the cam 19 to actuate the cylinder 9 (Fig. 19) to depress the hold-down bar 400 (Fig. 39) and to bring together the several strips of paper and foil which extend across the rearward lower mandrel segment 171. This places all of the strips P and F in compact superimposed arrangement at the point where they pass over the mandrel segment 171 to permit the subsequent projection of the upper mandrel segment 172 thereover.

As the cam shaft 466 (Fig. 29) is rotated further it causes the cam 12 to actuate the air cylinder 2 (Fig. 2) to project the rearward upper mandrel segment 172 into position overlying the lower mandrel segment 171 and the interposed strips, the air cylinder 2 then returning to its retracted position. The rearward mandrel segments 171 and 172, when in projected position, firmly grip the several strips P and F therebetween (Fig. 39) and thus permit the strips to be wound on to the mandrel when the latter is rotated. The flats on the mandrel segments may be inclined corresponding to the inclination of the strips passing over the bottom segment, thus aiding in the prevention of the cutting of the strips by the top mandrel segment when it is moved into gripping position.

Further rotation of the cam shaft 466 (Fig. 29) causes the cam 16 to actuate the cylinder 6 (Fig. 19) which depresses the guide bracket 417 and the cutter blades 416 carried thereby to sever all of the strips at the portions where they extend between the mandrel 170 and the mandrel guide shaft 160, as illustrated in Fig. 40. The air cylinder 6 is then returned to permit the guide bracket 417 to be raised to inactive position.

The cam 19 (Fig. 29) next causes the air cylinder 9 to retract and raise the hold-down bar 400.

The cylinder 5 (Fig. 2) is then permitted by its cam 15 to return which permits the offset and cutter mechanism 410 to rock into its inactive position whereafter the cylinder 8 is permitted to return by its cam 18 which retracts the offset and cutter mechanism 410.

After the strips have been cut and the offset bar 415 and cutter blades 416 have been raised, and at about the time the offset and cutter mechanism 410 is retracted, the cam 17 (Fig. 29) actuates the cylinder 7 (Fig. 27) to rock the reset handle 315 to reset the productimeter 303 and actuate the microswitch 304 to open the contact o thus opening the cam motor circuit (Fig. 33) to deenergize the cam motor 394 and the solenoid 481 thereby bringing the cam shaft 466 to a sudden halt.

The movement of the reset handle 315 closes the microswitch 304 on the contact c (Fig. 34) to energize the mandrel motor 260 and rotate the mandrel shaft 160 and the two mandrels 170 driven thereby. The solenoid 286 is energized at the same time as the mandrel motor 260 to retract the stop pin 281 which permits the driving shaft 265 to be rotated. It should be explained at this point that the microswitch 396 (Fig. 34) must be closed before the mandrel motor 260 can be energized. The microswitch 396 is closed only when the winding head 130 is in its position against the head stop pin 370 and thus serves in effect as a safety device.

The mandrels 170 are simultaneously rotated through a predetermined number of revolutions in order to wind onto the rearward mandrel the desired number of turns and consequently the desired length of foil (and corresponding length of paper) to provide a capacitor having the desired capacitance. During this winding operation, the strips are maintained under the desired, predetermined tension to insure that the desired length of foil (and paper) is wound.

It will be seen that in the course of rotation of the winding head 130 from one position to another, the wrapper bar 196 serves to pick up and carry over the guide shaft 160 (i. e. the pivot axis about which the winding head 130 rotates) the upper paper strip in such manner that there is a greater length of such strip forwardly of the pivot axis than of the remaining strips.

After the foil and paper strips have been severed there is a length of the upper paper strip extending from the wound roll R, around the wrapper bar 196 and over the roll R and the guide shaft 160 which length is sometimes designated as the "tail" of the strip. Inasmuch as both the forward and rearward mandrels 170 are rotated simultaneously the forward mandrel will be rotated to wind the tail as the rearward mandrel is rotated to wind the strips on the mandrel. During this rotation of the forward mandrel the glue wiper head 436 is in position to apply glue to the paper and at the same time to apply a light pressure to the tail being wound to thereby cause the outer turns to be adhesively secured together to prevent unwinding of the roll R. At the same time the ink wiper head 445 marks the foil.

Where, as previously described, the wrapper bar 196 is removed and a wrapper bar (not shown) is substituted for the guide rod 194, there is a correspondingly greater length of "tail" than where the wrapper bar 196 is used. Consequently, when the machine is adjusted for winding a capacitor of larger than normal diameter, a "tail" of sufficient length will be provided.

The holders for the several strips of paper and foil respectively are adjusted so that all of the paper strips are in overlying relation as indicated diagrammatically in Figs. 41 and 42. The two strips of foil however are offset from each other and from the paper strips so that one strip projects slightly beyond the edges of the paper strips at one side and the other foil strip projects from the other side, thus permitting convenient attachment of conductors to the foil strips respectively. The wiper heads 436 and 445 are so located that the former bears on the paper strip P at the central portion or to one side thereof and the latter bears on the paper at the edge adjacent the end of the capacitor at which the outside foil projects so as to mark the paper at that end of the capacitor and thus indicate the location of the outside foil.

When the required number of turns of foil and paper are wound on the rearward mandrel 170, as determined by the productimeter 303, the latter actuates the microswitch 304 to open the contact c (Fig. 34) which de-energizes the motor 260 and the solenoid 286 to permit the stop mechanism 280 to halt the driving shaft 265 and consequently the mandrel 170.

When the microswitch 304 is actuated by the productimeter as just described, it is closed on the contact o to close the cam motor circuit (Fig. 33) and energize the cam motor 350 which again rotates the cam shaft 466. The cam 13 then operates the cylinder 3 (Fig. 2) which retracts the forward upper mandrel segment 172. At the end of the movement of the piston rod of the cylinder 3 it closes the microswitch 252 which thereby closes the circuit (Fig. 35) through the delay release solenoid 240 to retract the delay release pin 241, thereby preparing the forward lower mandrel segment 171 for retraction.

Further rotation of the cam shaft 466 operates the cylinder 4 (Fig. 2) which retracts the forward lower mandrel segment, thus stripping the finished capacitors off the forward lower mandrel segment 171. The finished capacitors drop through a discharge opening 610 (Fig. 2) in the main shelf 101 and may be collected in a collection receptacle (not shown) on the shelf 103.

It should be noted at this point that by reason of the successive retraction and consequent withdrawal of the mandrel segments 171, 172 from the wound roll R, there is no binding and consequently likelihood of disarrangement of the turns of the roll R, as would be possible, were the mandrel formed as a single member, or the mandrel segments withdrawn simultaneously. In order to further insure against any binding action, the mandrel segments are tapered in vertical cross-sectional dimension as previously described.

Upon completion of the above described winding operation and the subsequent retraction of the mandrel segments the mandrel rotating mechanism is halted, and the winding head 130 is rotated in a clockwise direction (as viewed in Fig. 36) through 180 degrees to carry thereby the rearward mandrel 170 up and over the mandrel guide shaft 160 to reverse the positions of the mandrels 170, that is to say, the mandrel which was formerly the rearward mandrel becomes the forward mandrel, and vice versa. As illustrated in Fig. 36 the forward mandrel 170 carries the wound roll R of foil and paper, and the foil and paper strips F, P extend rearwardly therefrom. The top paper strip additionally extends around the wrapper bar 196 so as to provide an excess of strip material which is to be wound around the roll to complete the capacitor.

The condition of the winding elements and strips immediately after the rotation of the winding head 130 into the new position is similar to that shown in Fig. 37, except that the offset bar 415 and cutter blade 416 have not yet been moved into projected position.

The piston rod of the cylinder 4 at the end of its outward movement closes the head stop microswitch 250 which energizes the head stop solenoid 378 to rock the head stop pin 370 out of engagement with the guide 195 to permit the winding head 130 to rotate. The cam 14 is a short cam and permits the cylinder 4 to return, thus opening the head stop microswitch 250 and deenergizing the head stop solenoid 378 to permit the head stop pin 370 to return immediately to its position wherein it halts the rotation of the winding head 130. This occurs prior to the rotation of the winding head 130 through 180 degrees so that by the time it has rotated through such angle the head stop pin 370 is in position to halt the winding head 130 in such position.

Further rotation of the cam shaft 466 (Fig. 29) causes the cam 10 (Fig. 2) to open the microswitch 460 (Fig. 33). Since at this time both the contact o of the productimeter microswitch 304 is open and the microswitch 393 is open, the cam motor 394 is deenergized to thereby halt the rotation of the cam shaft 466. Thus, the cam controller 461 (Fig. 29) is held stationary while the winding head 130 is rotated into its new position. By the time the winding head 130 reaches its new position one or the other of the cams 392 on the cam arm 390 (Fig. 2) will have been rotated by the winding head shaft 150 into position to close the microswitch 393, which energizes the cam motor 394 and causes the cam shaft 466 to be rotated.

At this point the winding cycle is again initiated, and is repeated so long as the machine remains energized.

While the present invention has been described in connection with the simultaneous forming of two electrical capacitors having certain arrangements of paper and foil it is to be understood that the invention is not thus limited. The machine of the present invention, while adapted for winding two capacitors simultaneously may be employed for winding a single capacitor. Moreover, while the machine disclosed is particularly well adapted for winding a plurality of strips simultaneously into a single roll, it will be understood that it also may be employed to wind a single strip into a roll where such operation may be desirable. The machine is adapted for winding strips of greater or smaller widths than the strips shown and it may be modified in a manner which will be apparent from the foregoing description to wind strips of even much greater widths than those disclosed. Furthermore, the mandrel sizes may be of various diameters to wind rolls of various inside diameters and they may be flattened, or flattened and folded.

I claim:

1. In a machine for winding strip material to form a roll, in combination, a mandrel including a pair of segments one of which is supported by the other slidably in a longitudinal direction relative thereto and rigid therewith against other relative movement, each of said segments being independently projectable into and retractable from a winding position in which said segments are in closely juxtaposed relation, means for carrying said strip material across said winding position, means for projecting one of said segments, means for projecting the other mandrel segment to clamp the strip material between said segments, means for rotating said segments as a unit to wind the strip material thereon, and means for successively retracting said segments to withdraw them from the wound roll of strip material.

2. In a machine for winding strip material to form a roll, in combination, a mandrel including a first segment having one end free and the other end supported, and a second segment having one end free and the other end supported by the supported end of said first segment, said segments having complementally inclined flat faces, whereby one of said segments is tapered toward its free end and the other is tapered toward its supported end, slidable longitudinally relatively to each other, and independently projectable into and retractable from a winding position in which said segments are in closely juxtaposed relation, means for carrying an end of said strip material across said winding position, means for projecting said one segment, means for projecting said other mandrel segment to clamp the strip material between said segments, means for rotating said segments as a unit to wind the strip material thereon, and means for retracting said other segment and thereafter said one segment to withdraw them from the wound roll of strip material.

3. In a machine for winding strip material to form a roll, in combination, a winding head, means mounting said head for rotation about an axis, a pair of mandrels carried by said head in positions diametrically spaced from and parallel to said axis, each mandrel including a pair of segments one of which is supported by the other and is slidable longitudinally relative to said other segment but is rigid therewith against other relative movement, each of said segments being independently projectable into and retractable from a winding position in a direction parallel to said axis, means for rotating said winding head progressively and intermittently into two different rotational positions to move said mandrels successively into two corresponding positions, means for projecting the segments of each mandrel successively when the mandrel is in one of said rotational positions and means for retracting said mandrel segments successively when they are in the other of said rotational positions, and means for rotating both said mandrels when in either of said positions.

4. In a machine for winding strip material to form a roll, in combination, a mandrel shaft having a slot extending longitudinally thereof, a lower mandrel segment disposed in said slot and rigidly secured to said shaft and projecting beyond the end thereof, a mandrel arm slidably disposed in said slot for longitudinal movement between a retracted and a projected position relatively to said shaft, and an upper mandrel segment secured to said arm and projecting beyond the end thereof in overlying relation to said lower mandrel segment, said mandrel segments having complementally arranged, opposed flat faces disposed in closely juxtaposed relation when said mandrel shaft and mandrel arm are in said projected position.

5. In a machine for winding strip material to form a roll, in combination, a mandrel shaft having a slot extending longitudinally thereof, a lower mandrel segment disposed in said slot and rigidly secured to said shaft and projecting beyond the end thereof, a mandrel arm slidably disposed in said slot for longitudinal movement between a retracted and a projected position relatively to said shaft, and an upper mandrel segment secured to said arm and projecting beyond the end thereof in overlying relation to said lower mandrel segment, said mandrel segments having opposed flat faces, complementally inclined longitudinally of said segments and disposed in closely juxtaposed relation when said mandrel shaft and mandrel arm are in said projected position.

6. A drive mechanism for rotating a shaft and halting it in a predetermined position of rotation comprising a motor, a first clutch plate on the shaft to be driven and supported for rotational and axial movement relative thereto, a second clutch plate fixed to the shaft to be driven, spring means urging said first and second clutch plates into frictional contact, a friction drive connecting said motor to the first clutch plate, a rotatable member having a plurality of circumferentially arranged, spaced abutments thereon, a positive drive connecting said rotatable member to the shaft to be driven, an abutment member projectable into and retractable out of the path of movement of the abutments on said rotatable member for engagement with one of the abutments thereon for halting said rotatable member, means for projecting and retracting said abutment member, and means acting concurrent with said abutment projecting means for deenergizing said motor.

7. A drive mechanism for rotating a shaft and halting it in a predetermined position of rotation comprising a motor, means including a friction clutch drivingly connecting said motor to the shaft to be driven, a rotatable member having a plurality of circumferentially arranged, spaced abutments thereon, means positively connecting said rotatable member in driven relation to the shaft to be driven, an abutment member projectable into and retractable out of the path of movement of the abutments on said rotatable member for engagement with one of the abutments thereon for halting said rotatable member, means for projecting and retracting said abutment member, and means for preventing reverse rotation of said rotatable member.

8. A drive mechanism for rotating a shaft and halting it in a predetermined position of rotation comprising an electric motor, means including a friction clutch drivingly connecting said motor to the shaft to be driven, a rotatable member having a plurality of circumferentially arranged, spaced abutments thereon, means positively connecting said rotatable member in driven relation to the shaft to be driven, an abutment member projectable into and retractable out of the path of movement of the abutments on said rotatable member for engagement with one of the abutments thereon for halting said rotatable member, and means normally urging said abutment member into projected position, and electromagnetic means electrically energized with said motor for retracting said abutment member.

9. In a machine for winding a plurality of strips of material to form a roll, in combination, a winding head carrying a winding mandrel, means for rotating said mandrel about its axis, means for supporting said strips to be wound, withdrawal means engaging at least one but less than all of the strips for withdrawing additional lengths thereof beyond the length of the other non-engaged strips, cutting means for severing the strips between said supporting means and said mandrel, means for slidably moving said cutting means in a direction parallel to the axis of said mandrel between a position extending across and spaced from said strips and a position away from said strips, and means for actuating said cutting means when in said first position to cut said strips.

10. In a machine for winding strip material to form a roll, in combination, means for holding a supply of material to be wound, a winding head mounted for rotation about an axis, a pair of mandrels carried by said head on opposite sides of and parallel to said axis and projectable into and retractable from a winding position in a direction parallel to said axis, each said mandrel including a pair of juxtaposed mandrel segments, one of which is supported by the other and is slidable longitudinally relative to said other segment but is rigid therewith against other relative movement, each of said segments being independently projectable and retractable, means for rotating said winding head progressively and intermittently to move said mandrels successively into two different translational positions, means for projecting said mandrel segments successively when in one of said translational positions for gripping the material therebetween at a point between said supply and said other mandrel, means for severing said material extending between said mandrels, means for rotating both of said mandrels to wind material thereon, and means for retracting said mandrels successively when in the other of said translational positions to discharge said wound and severed material.

11. In a machine for winding strip material to form a roll, in combination, a winding head mounted for rotation about an axis, a pair of mandrels carried by said head on opposite sides of and parallel to said axis and projectable into and retractable from a winding position in a direction parallel to said axis, each said mandrel including a pair of juxtaposed mandrel segments independently projectable and retractable, means for rotating said winding head, means for halting said winding head successively in each of two positions of rotation whereby said mandrels are successively moved into and halted in a first position and a second position, means for projecting said mandrel segments successively when each mandrel is in said first position, means for retracting said mandrel segments successively when each mandrel is in said second position, means holding one of said segments against retraction until said holding means are released by the retraction of said other segment, and means for rotating both of said mandrels simultaneously when they are in both positions.

12. In a machine for winding strip material to form a roll, in combination, a winding head mounted for rotation about an axis, a pair of mandrels carried by said head on opposite sides of and parallel to said axis and projectable into and retractable from a winding position in a direction parallel to said axis, each said mandrel including a pair of juxtaposed mandrel segments independently projectable and retractable, means for rotating said winding head, means for halting said winding head successively in each of two positions of rotation whereby said mandrels are successively moved into and halted in a first position and a second position, means for projecting said mandrel segments successively when each mandrel is in said first position, means for retracting said mandrel segments successively when each mandrel is in said second position, means energized upon retraction of the second of said two mandrel segments for disabling said halting means to permit said head to be rotated, and means for rotating both of said mandrels simultaneously when they are in both positions.

13. In a machine for winding strip material to form a roll, in combination, a rotatable winding head, a mandrel carried by said head for rotation thereon and for movement therewith, means for rotating said winding head progressively and intermittently into two successive positions to move said mandrel successively into two corresponding positions, and means for rotating said mandrel including an electric motor, an energizing circuit for said motor, a first, normally open switch connected in series with said motor, means active when said winding head is in either of said two positions for closing said first switch, a second, normally closed switch connected in series with said motor, and means active after a predetermined number of revolutions of said mandrel for opening said second switch.

14. In a machine for winding a plurality of strips of material together to form a roll, in combination, means for holding a supply of said material to be wound, a winding head, means mounting said head for rotation about an axis, a pair of mandrels carried by said head and diametrically spaced from and parallel to said axis, each said mandrel including a pair of segments slidable longitudinally relatively to each other, and independently projectable into and retractable from a winding position in which said segments are in closely juxtaposed relation, means for rotating said winding head progressively and intermittently into two different rotational positions to move said mandrels successively into corresponding first and second positions, means for projecting one of said segments of the mandrel in first position, means for drawing a length of said material across said projected segment, first withdrawal means engageable with at least one but less than all of said strips beyond said projected segment for withdrawal of an additional length of said engaged strips beyond said projected segment, means for projecting the other segment of the mandrel in first position to clamp the strips between said segments, means for rotating said segments as a unit to wind the strips thereon, second withdrawal means engageable with at least one of the others of said strips during rotation of said mandrels to their translational positions to provide an additional length of material between said two mandrels, means for severing said wound portions from said supply, and means for successively retracting said segments to withdraw them from the wound portions.

15. In a machine for winding a plurality of strips of material together to form a roll, certain of said strips being of conducting material and the others being of insulating material, with said conducting strips separated by insulating strips when all said strips are wound together, in combination, means for holding a supply of said strips to be wound, a winding head, means mounting said head for rotation about an axis, a pair of mandrels carried by said head in position diametrically spaced from and parallel to said axis, each said mandrel including a pair of segments slidable longitudinally relatively to each other, and independently projectable into and retractable from a winding position in which said segments are in closely juxtaposed relation, means for rotating said winding head progressively and intermittently into two different rotational positions to move said mandrels successively into corresponding first and second positions, means for projecting one of said segments of the mandrel in first position, means for drawing lengths of said material across said projected segment, first withdrawal means acting beyond said projected segment relative to said strip supply means and engageable with at least one but less than all said conducting strips and at least one overlying inslulating strip for each said conducting strip, said first means withdrawing an additional length of said engaged strips beyond said projected segment, means for projecting the other segment of the mandrel in first position to clamp the strips between said segments, means for rotating said segments as a unit to wind the strips thereon, second withdrawal means engageable with at least one but less than all of said insulating strips during rotation of said mandrels to their translational positions to provide an additional length of material of said second engaged strips, means acting intermediate of the mandrel in said first position and the first withdrawal means for severing all said strips from said supply means after completion of rotation of said clamped segments, completion of movement of said mandrels to their translational positions, completion of withdrawal of the additional length of material by said first withdrawal means, and completion of the strip clamping projection of the second of the segments of said mandrel in said first position, and means for successively retracting said segments to withdraw them from the wound portions.

References Cited in the file of this patent
UNITED STATES PATENTS

| | | |
|---|---|---|
| 131,924 | Wolff | Oct. 1, 1872 |
| 1,145,337 | Street | July 6, 1915 |
| 1,231,378 | Kelly | June 26, 1917 |
| 1,467,841 | Cumfer | Sept. 11, 1923 |
| 1,496,485 | Neal et al. | June 3, 1924 |
| 2,205,171 | Kile et al. | June 18, 1940 |
| 2,232,966 | Peterson | Feb. 25, 1941 |
| 2,340,340 | Nordberg | Feb. 1, 1944 |
| 2,384,983 | Weiss | Sept. 18, 1945 |
| 2,416,540 | Nordberg | Feb. 25, 1947 |
| 2,459,536 | Nordberg | Jan. 18, 1949 |
| 2,498,336 | Kennedy | Feb. 21, 1950 |
| 2,622,401 | Drago | Dec. 23, 1952 |
| 2,644,310 | Detrez | July 7, 1953 |